United States Patent
Wiebe

(10) Patent No.: US 9,221,109 B2
(45) Date of Patent: Dec. 29, 2015

(54) INSTALLATION SYSTEMS AND METHODS FOR INSTALLING AN OBJECT

(71) Applicant: Charles Wiebe, St. Louis, MO (US)

(72) Inventor: Charles Wiebe, St. Louis, MO (US)

( * ) Notice: Subject to any disclaimer, the term of this patent is extended or adjusted under 35 U.S.C. 154(b) by 371 days.

(21) Appl. No.: 13/860,989

(22) Filed: Apr. 11, 2013

(65) Prior Publication Data

US 2013/0287510 A1    Oct. 31, 2013

Related U.S. Application Data

(60) Provisional application No. 61/623,002, filed on Apr. 11, 2012.

(51) Int. Cl.
| | |
|---|---|
| *B23B 51/12* | (2006.01) |
| *B23B 51/00* | (2006.01) |
| *B23B 49/00* | (2006.01) |
| *B23B 51/10* | (2006.01) |
| *B27G 15/00* | (2006.01) |
| *E04F 21/26* | (2006.01) |

(52) U.S. Cl.
CPC .............. *B23B 51/12* (2013.01); *B23B 49/00* (2013.01); *B23B 51/0018* (2013.01); *B23B 51/0054* (2013.01); *B23B 51/107* (2013.01); *B27G 15/00* (2013.01); *E04F 21/26* (2013.01); *B23B 2270/12* (2013.01); *Y10T 408/04* (2015.01); *Y10T 408/5584* (2015.01)

(58) Field of Classification Search
CPC ..................... Y10T 408/8923; Y10T 408/892; B23B 51/0009; B23B 51/0018; B23B 51/0054; B23B 2231/04; B23B 2251/60; B23B 2251/603; B27G 15/00

USPC .................................................. 407/201, 200
See application file for complete search history.

(56) References Cited

U.S. PATENT DOCUMENTS

| | | | | |
|---|---|---|---|---|
| 55,144 | A | * | 5/1866 | Moody ......................... 408/201 |
| 63,822 | A | * | 4/1867 | Young ........................... 408/201 |
| 104,958 | A | * | 7/1870 | Hotchkiss ..................... 408/201 |
| 669,764 | A | * | 3/1901 | Potter ........................... 408/201 |
| 676,669 | A | * | 6/1901 | Wack ............................ 408/201 |
| 797,770 | A | * | 8/1905 | Hazlet ........................... 408/201 |
| 897,041 | A | * | 8/1908 | Weller ............................ 408/82 |
| 1,131,871 | A | * | 3/1915 | Spoer ........................... 408/201 |
| 1,332,898 | A | * | 3/1920 | Hossie et al. ................... 408/82 |
| 1,336,466 | A | * | 4/1920 | Lamb ........................... 408/201 |
| 1,407,328 | A | * | 2/1922 | Glenzer ........................ 408/201 |
| 1,471,471 | A | * | 10/1923 | Adams ........................ 408/83.5 |
| 1,571,260 | A | * | 2/1926 | Gairing ........................ 408/201 |
| 2,226,226 | A | * | 12/1940 | Hedin ........................... 408/201 |
| 2,359,474 | A | * | 10/1944 | Gairing ........................ 408/201 |

(Continued)

FOREIGN PATENT DOCUMENTS

GB          2018644 A   * 10/1979

*Primary Examiner* — Sunil K Singh
*Assistant Examiner* — Ryan Rufo
(74) *Attorney, Agent, or Firm* — Senniger Powers LLP

(57) ABSTRACT

Installation systems, apparatus, and methods for use in enlarging an opening in a surface and/or installing an object in an opening in a surface. A rotary bit adaptor is adapted for mounting a guide on a rotary bit for centering the rotary bit in an existing opening for enlarging the opening on center. A support system includes a connector having a retainer and a support in ratcheting engagement with the support for supporting an object in an opening. The installation systems, apparatus, and methods are disclosed with respect to installation of balusters in stairway balustrades.

17 Claims, 40 Drawing Sheets

(56) References Cited

U.S. PATENT DOCUMENTS

| | | | |
|---|---|---|---|
| 2,811,054 A * | 10/1957 | Townsend | 408/201 |
| 3,358,531 A * | 12/1967 | Schaffler | 408/201 |
| 3,870,278 A | 3/1975 | Lee | |
| 4,019,827 A * | 4/1977 | Christianson et al. | 408/202 |
| 4,033,703 A * | 7/1977 | Slater | 408/211 |
| 4,043,698 A * | 8/1977 | Chelberg | 408/201 |
| 4,043,699 A * | 8/1977 | Farrand | 408/201 |
| 4,325,661 A * | 4/1982 | Tickins | 408/239 A |
| 4,386,761 A | 6/1983 | Kato | |
| 4,512,691 A * | 4/1985 | Dicke | 408/201 |
| 4,819,526 A * | 4/1989 | Geise | 82/113 |
| 5,030,040 A * | 7/1991 | Wood | 408/59 |
| 5,078,555 A * | 1/1992 | Aurentz | 408/231 |
| 5,277,528 A * | 1/1994 | Robinson | 408/201 |
| 5,598,788 A | 2/1997 | Jonker | |
| RE36,550 E | 2/2000 | West | |
| 6,048,141 A * | 4/2000 | Freeman | 408/201 |
| 6,290,212 B1 | 9/2001 | Bartel | |
| 6,612,533 B2 | 9/2003 | Biles et al. | |
| 6,881,017 B1 * | 4/2005 | Krecek et al. | 408/204 |
| 7,008,149 B1 * | 3/2006 | Rhoades | 408/1 R |
| 7,264,427 B1 * | 9/2007 | Kunz-Mujica | 408/202 |
| 7,290,742 B2 | 11/2007 | Wang | |
| 7,909,311 B2 | 3/2011 | Edwards | |
| 7,971,412 B1 | 7/2011 | Lim | |
| 8,033,530 B2 | 10/2011 | Timothy | |
| 8,348,559 B1 * | 1/2013 | Criswell | 408/82 |
| 2006/0228181 A1 * | 10/2006 | Kozak | 408/239 R |
| 2010/0154328 A1 | 6/2010 | Edwards | |
| 2011/0147687 A1 | 6/2011 | Sgariglia | |

* cited by examiner

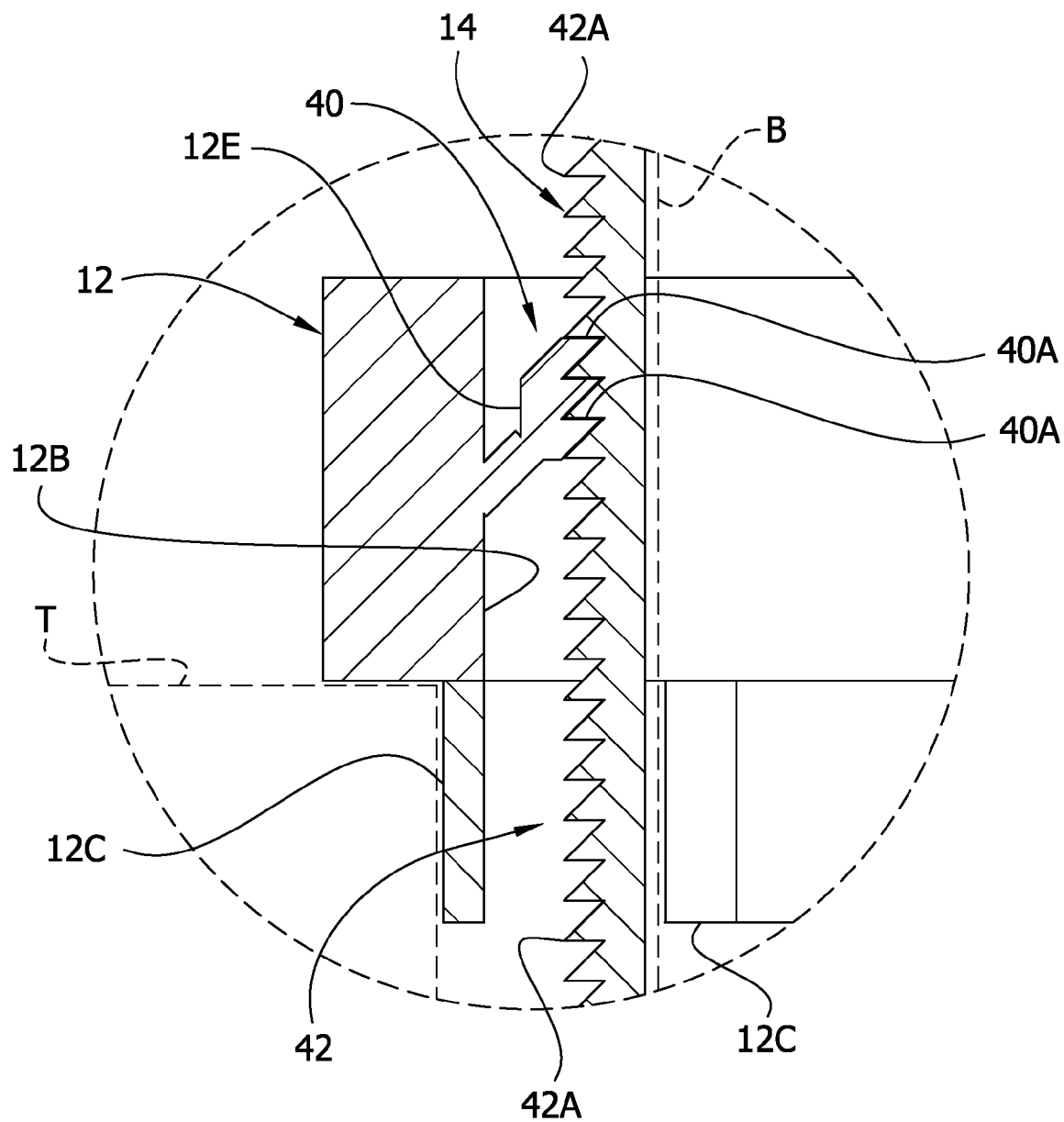

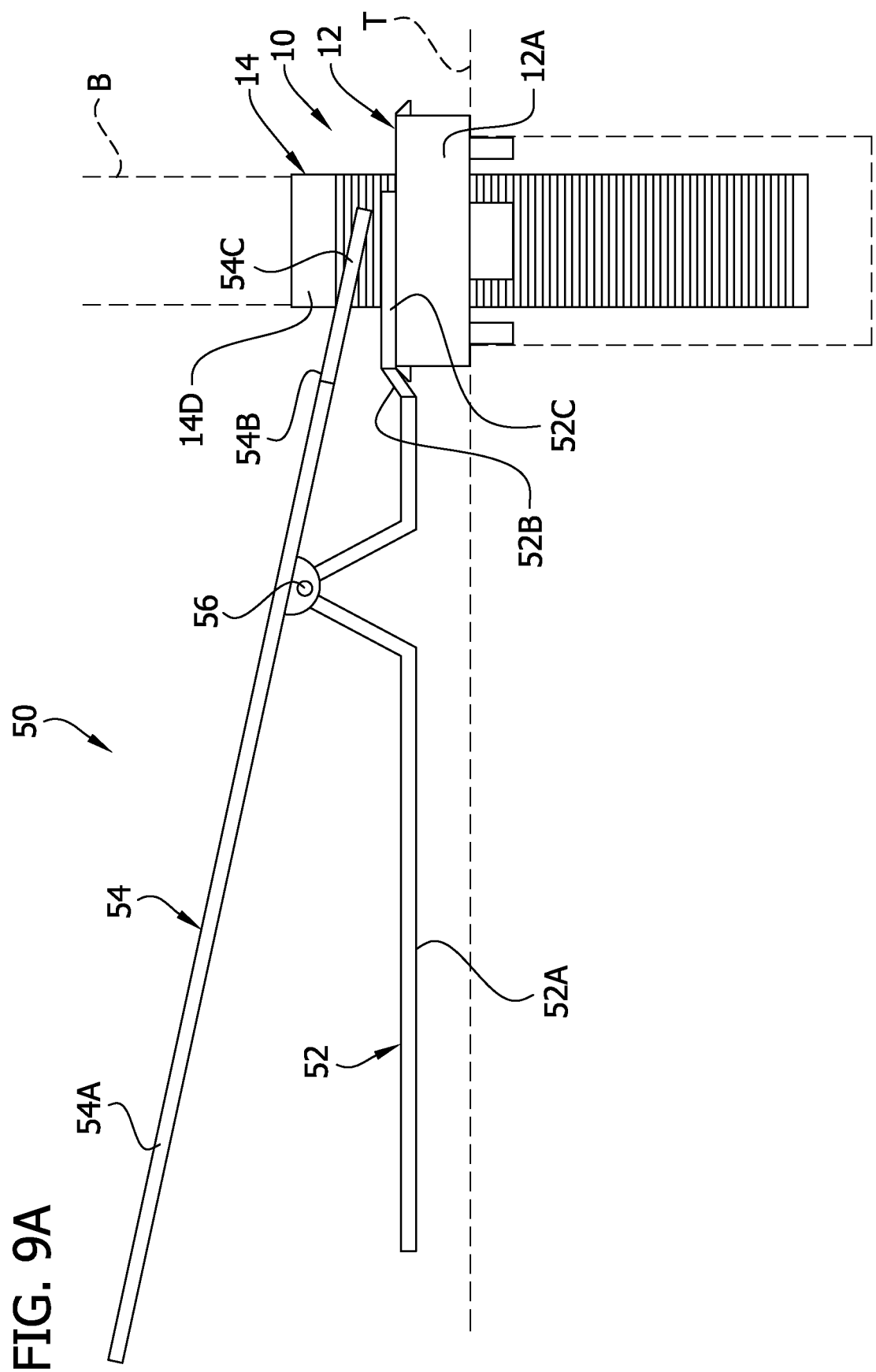

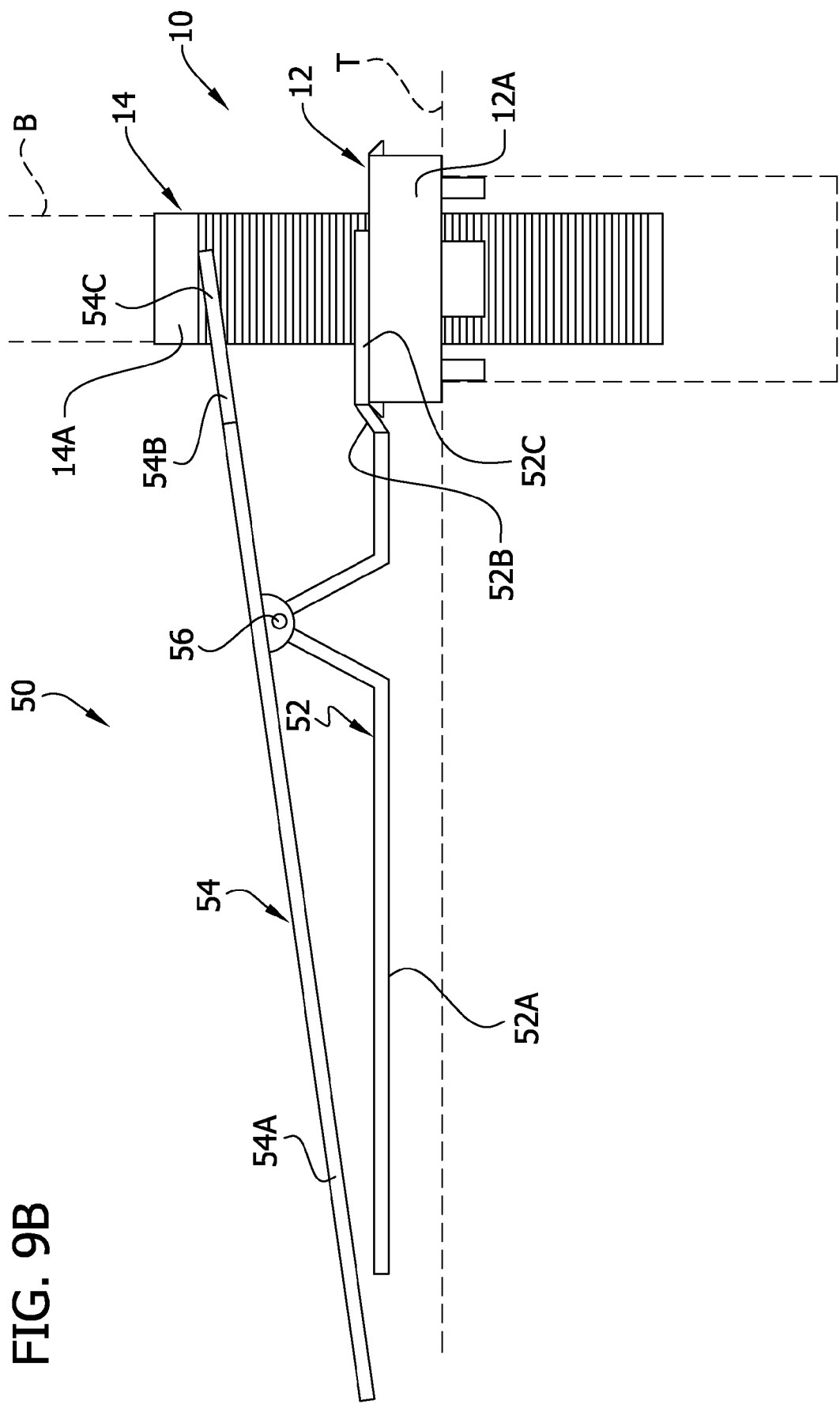

INSTALLATION SYSTEMS AND METHODS FOR INSTALLING AN OBJECT

REFERENCE TO RELATED APPLICATIONS

The present application claims the benefit of U.S. Provisional Application No. 61/623,002, filed Apr. 11, 2012, the entire content of which is incorporated herein by reference.

FIELD OF THE INVENTION

The present disclosure generally relates to installation systems and methods, and more particularly, to installation systems and methods for installing objects such as balusters of a stairway balustrade.

BACKGROUND

Most stairways include a hand rail which provides support for a hand of a person ascending or descending the stairway. Some hand rails are supported by balusters which extend upward from treads of the stairway. The person walks on the treads to ascend or descend the stairway. In residential and other settings, balusters have traditionally been made of wood. More recently, metal balusters have become popular. It is now common to replace existing wood balusters with metal balusters and to install metal balusters in new construction. Conventional methods of installing metal balusters involve several time consuming steps which require a high degree of precision and do not result in an optimal installation. Improvements are needed.

Although the systems and methods disclosed herein are described with respect to stairways and installation of components of balustrades, it will be appreciated that the systems and methods may be used in other settings without departing from the scope of the present invention.

SUMMARY

In a first aspect, the present invention includes a rotary bit adaptor for centering a rotary bit in an existing opening to be enlarged by the rotary bit. The rotary bit includes a shaft and a head having a tip and cutting blades extending laterally with respect to the tip. The rotary bit includes a longitudinal axis along which the shaft and tip extend. The rotary bit adaptor includes a mount and a guide. The mount is adapted for releasable mounting on the rotary bit. The guide is adapted for guiding the tip of the rotary bit into the existing opening in a position in which the tip of the rotary bit is centered in the opening.

In another aspect, the present invention includes a kit for centering a rotary bit in an existing opening to be enlarged by the rotary bit. The rotary bit includes a shaft and a head having a tip and cutting blades extending laterally with respect to the tip. The rotary bit includes a longitudinal axis along which the shaft and tip extend. The kit includes a mount adapted for releasable mounting on the rotary bit. The kit also includes a plurality of guides selectively mountable on the mount for guiding the tip of the rotary bit into the existing opening in a position in which the tip of the rotary bit is centered in the opening. The plurality of guides include guides having different sizes for selective mounting on the mount for guiding the rotary bit into existing openings of different sizes.

In yet another aspect, the present invention includes a method of enlarging an existing opening from a first size to a second size greater than the first size using a rotary bit. The method includes selecting a guide having a size corresponding to the size of the existing opening, mounting the guide on the rotary bit, guiding the rotary bit into the existing opening using the guide mounted on the rotary bit, and rotating the rotary bit to enlarge the existing opening.

In yet another aspect, the present invention includes a support system for supporting an object in an opening in a surface. The support system includes a connector positionable at least partially in the opening in the surface. The connector comprises a support adapted for receiving at least a portion of the object and a retainer having an opening in which the support is receivable. The support and retainer include corresponding securement surfaces configured for non-rotational ratcheting engagement with each other.

In yet another aspect, the present invention includes a retainer for supporting an object in an opening in a surface. The retainer includes a frame including an opening in which the object is receivable and securement surfaces connected to the frame. The securement surfaces are adapted for non-rotational ratcheting engagement for supporting the object in the frame opening in the opening in the surface.

In yet another aspect, the present invention includes a method of supporting an object in an opening in a surface. The method includes receiving the object in the opening in the surface, moving the object in a first direction tending to withdraw the object from the opening in the surface, and, by ratcheting engagement with a retainer, permitting the object to be moved in the first direction and preventing the object from being moved in a second direction opposite the first direction tending to advance the object farther into the opening in the surface.

BRIEF DESCRIPTION OF THE DRAWINGS

FIG. 7 is an enlarged portion of the section of FIG. 6A illustrating in closer detail engagement of securement surfaces of the retainer and support;

FIG. 9A is an elevation of the tool and the connector, the support of the connector being shown in a starting position, and the tool shown engaging the connector;

FIG. 9B is a view similar to FIG. 9A but showing the support of the connector moved from the starting position to a raised position;

Corresponding reference characters indicate corresponding parts throughout the drawings.

DETAILED DESCRIPTION

The present invention is directed to an installation system and methods for installing an object. For example, the installation system and methods may be used for installing balusters of a stairway balustrade. The installation system and methods may be used to construct stairway balustrades in new construction and/or to install new balusters in balustrades of pre-existing stairways. As explained in further detail below, the installation system may include a support system and tools used for installing the support system. Methods of the present invention may include methods of installing the object (e.g., a baluster) and support system and/or using the various tools associated with the support system.

The installation system and methods are described herein with respect to installation of balusters in stairway balustrade construction. However, it will be understood that the installation system and methods have much broader applicability and may be used in other applications without departing from the scope of the present invention. For example, the installation system or parts thereof and the methods or steps thereof may be suitably adapted for the automotive, construction, plumbing, electrical, aerospace industries and other industries.

Figure 1:
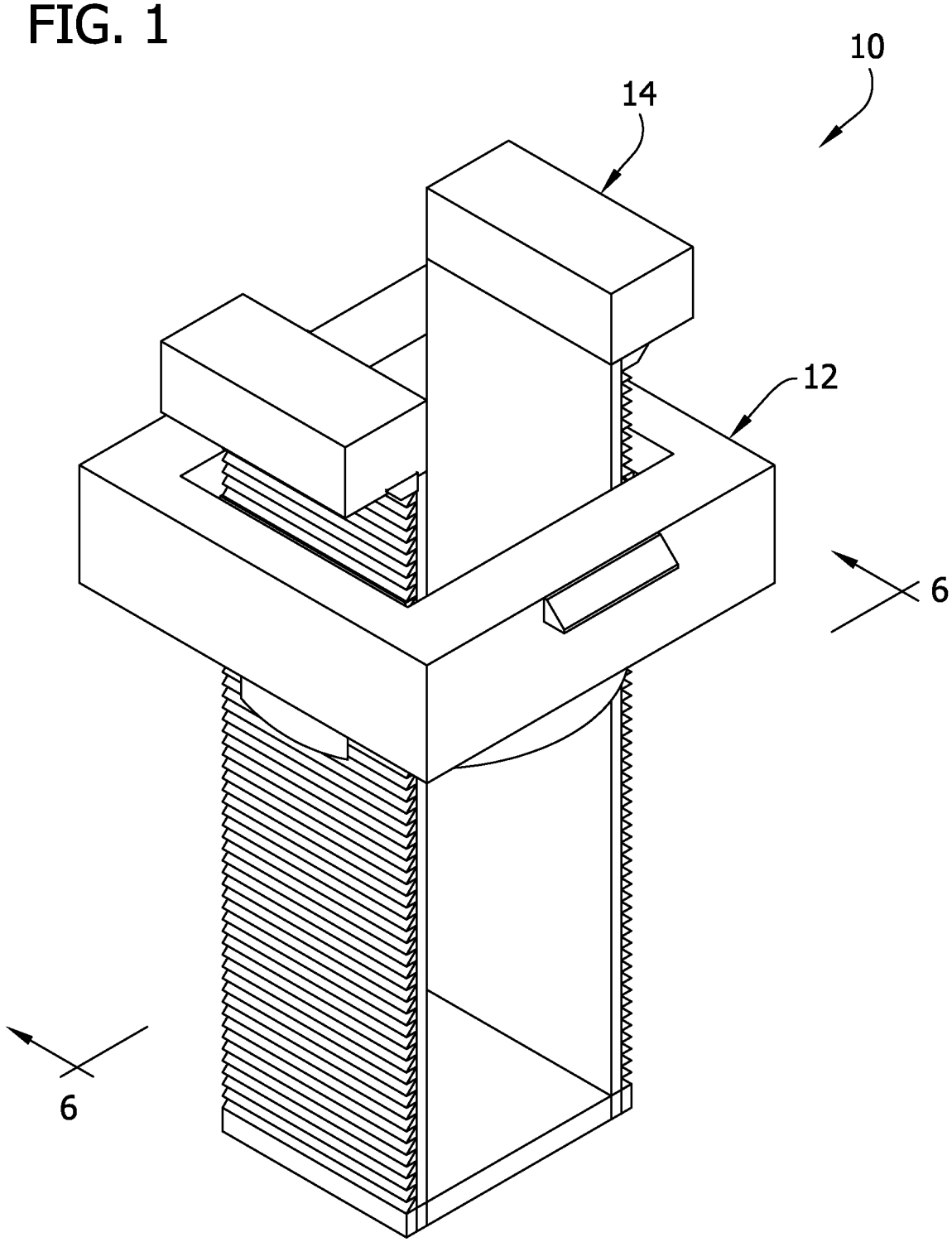
FIG. 1 is a perspective of a connector of the present invention, the connector including a retainer and a support.
Figure 13A:
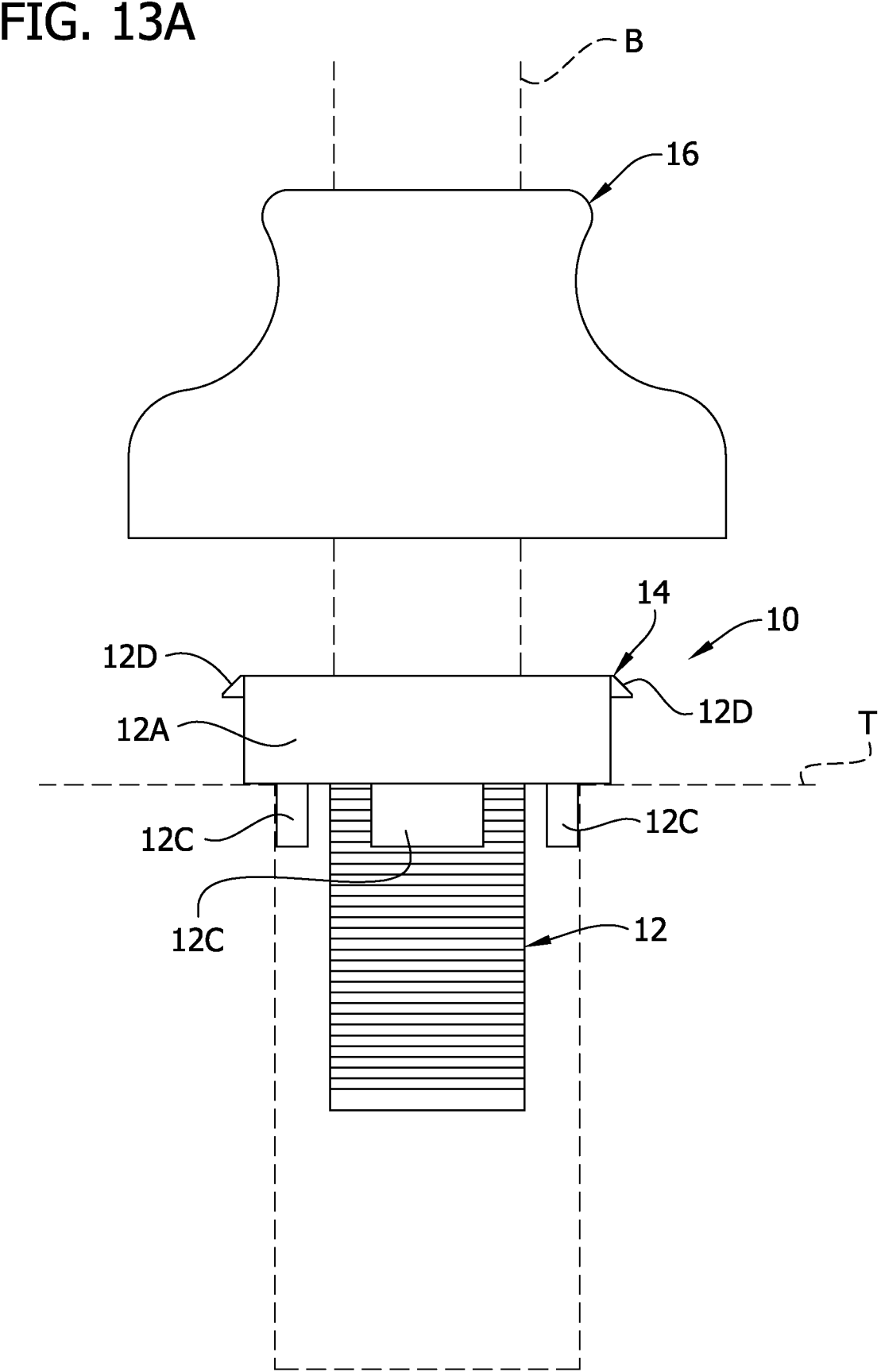
FIG. 13A is an elevation of the connector and a cover above the connector positioned for engagement with the connector for covering the connector.

Referring to FIG. 1, a support system of the present invention includes a connector designated generally by the reference number 10. The connector 10 includes a retainer 12 and a support 14. Connectors of this type may be adapted for supporting various types of objects. As will be described in further detail below, in the illustrated embodiment, the connector 10 is adapted for supporting a lower end of a baluster B in an opening in a tread T of a stairway. In general, the connector 10 is adjustable to position the lower end of the baluster B at a desired height in the tread opening. The support system may also include a cover 16 (e.g., see FIGS. 13A-13C) for covering the connector 10 and tread opening, as described in further detail below. The connector 10 and cover 16 may be formed of various suitable materials such as a plastic material (e.g., nylon).

Figure 2:
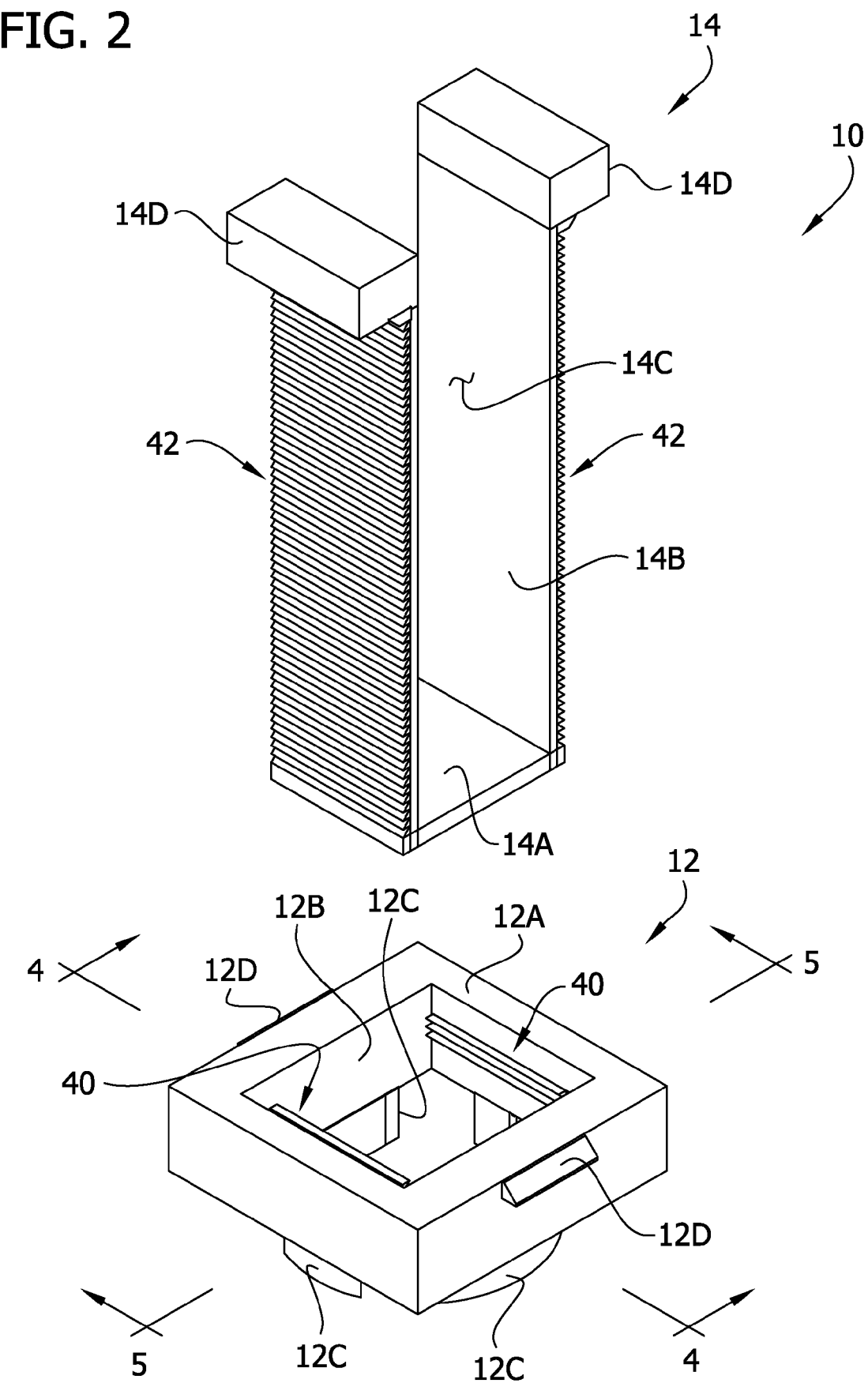
FIG. 2 is an exploded perspective of the connector.
Figure 3:
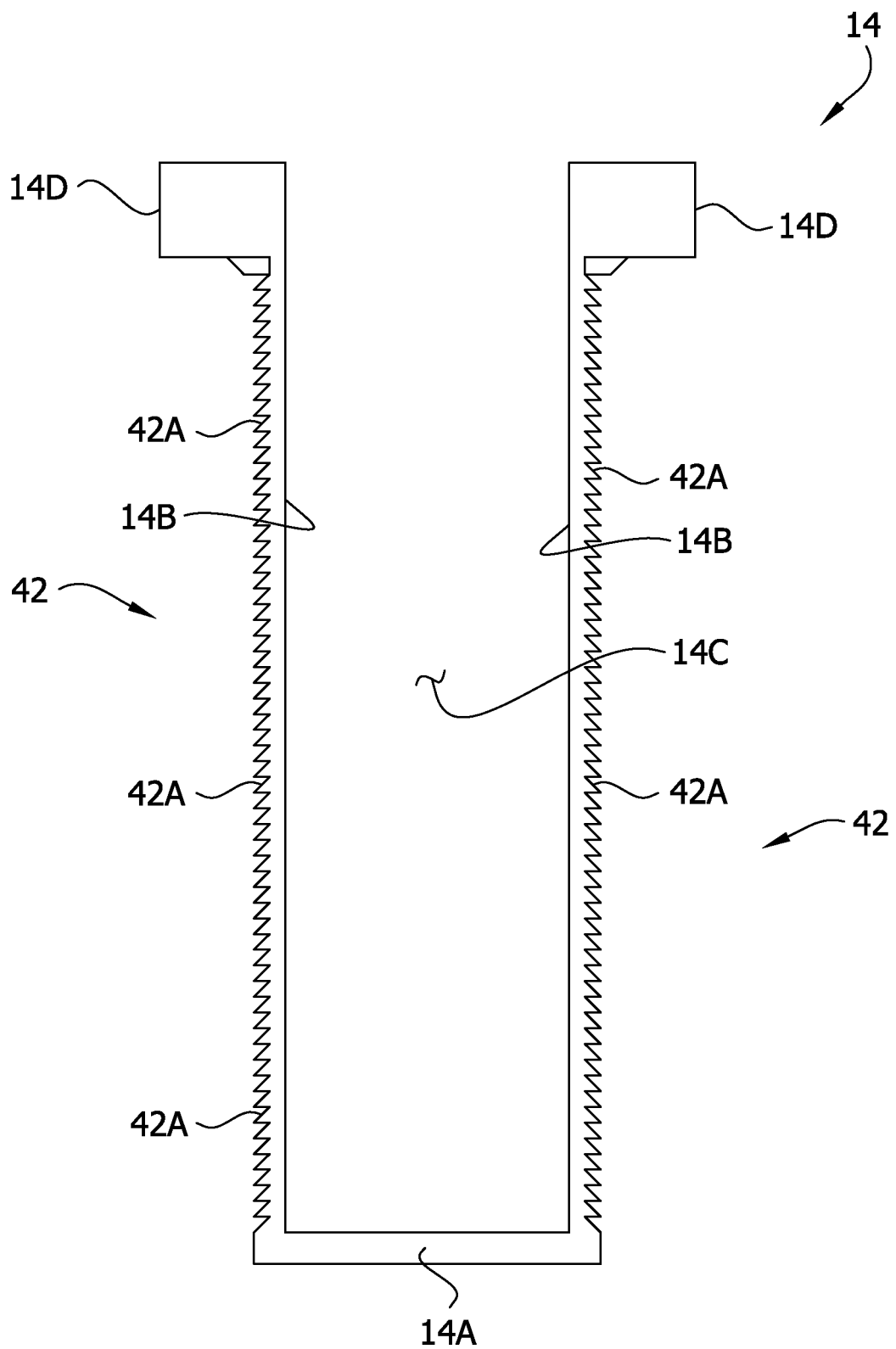
FIG. 3 is an elevation of the support of the connector.
Figure 6A:
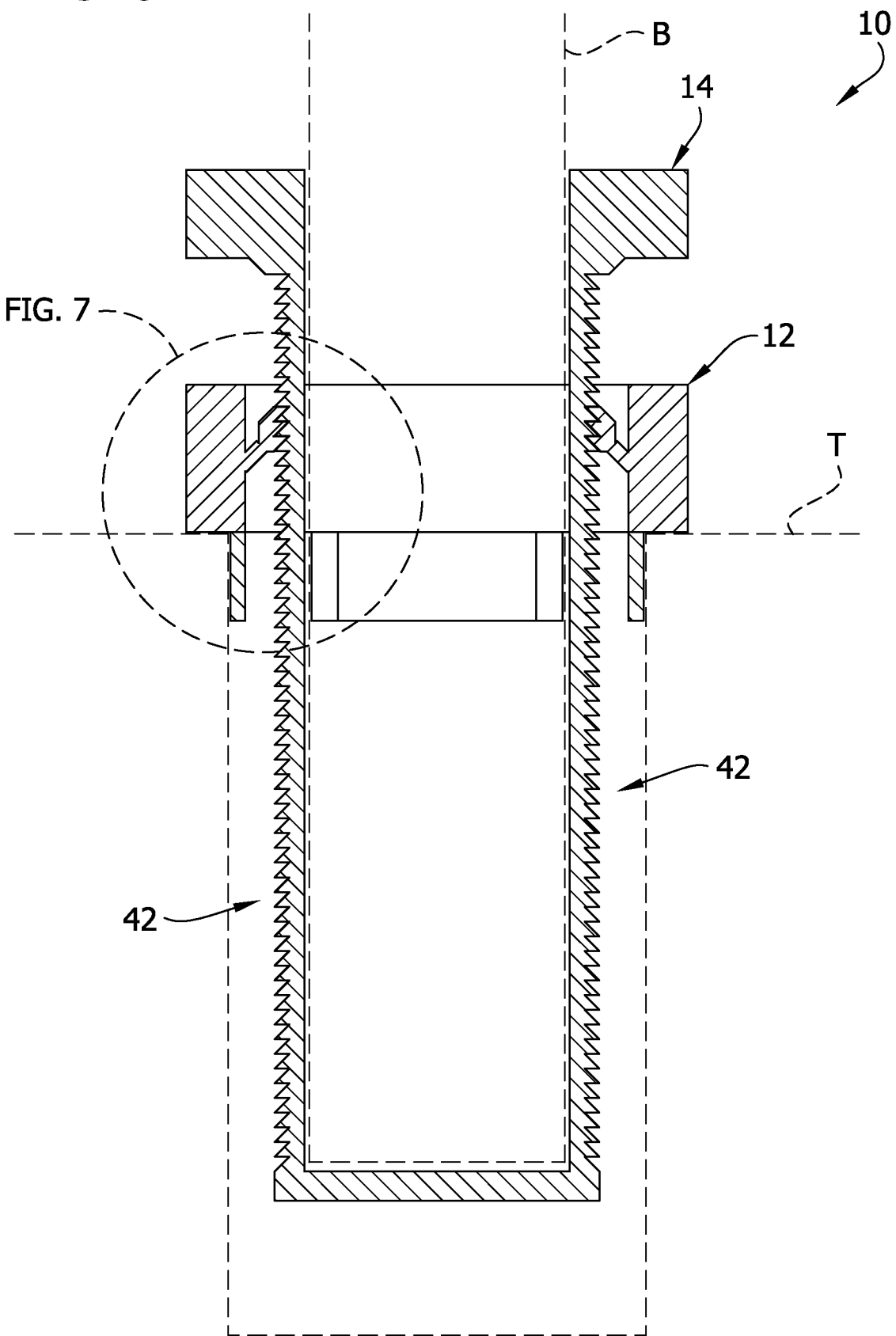
FIG. 6A is a section of the connector taken in the plane including line 6-6 in FIG. 1.

As shown in FIG. 2, the support is configured for mating engagement with the retainer 12. The retainer 12 is of female construction and the support 14 is of male construction. The retainer 12 includes a generally rectangular frame 12A and an opening 12B into which the support 14 (and the bottom portion of the baluster B) is receivable. The frame 12A is adapted for resting on the surface of the tread outside the opening in the tread. The frame 12 has a footprint which is larger than the opening to prevent the frame from falling into the opening. The support 14 is adapted for receiving the bottom portion of the baluster B. Referring to FIG. 3, the support 14 is generally U-shaped and includes a base 14A and two sides 14B extending upward from the base. In the illustrated embodiment, the support 14 has a cradle or sling type construction. The support 14 defines a cavity 14C above the base 14A and between the sides 14B sized and shaped for receiving the bottom end of the baluster B. FIG. 6A illustrates a baluster B received in the cavity 14C, the support received in an opening in a tread T, and the frame 12A of the retainer 12 resting on an upper surface of the tread. The base 14A of the support 14 is adapted for engaging and supporting the bottom of the baluster B. When the baluster B is inserted in the cavity 14C of the support 14, the sides 14B extend upward along opposite sides of the baluster. The support 14 includes flanges or shoulders 14D at the upper ends of the sides 14B which extend laterally outward from the sides for reasons which will become apparent.

In manufacture, the support 14 may be formed as a generally flat piece and then folded to form the support into the generally U-shape including the base 14A and upward extending sides 14B shown in FIG. 3. For example, the generally flat piece may be foldable or bendable about living hinges where the base 14A is connected to the sides 14B. The support 14 may include multiple living hinges such that the size of the base 14A and length of the sides 14B (and thus the size of the cavity 14C) may be formed as desired for a particular application. For example, such a support may be adaptable (e.g., by folding at different living hinges) for use with differently sized retainers and balusters. Alternatively, the support 14 may be formed in manufacture as having a generally U-shape.

As will become apparent, it is desirable that the size of the cavity 14C correspond to the size of the bottom end of the baluster B. As described above, in the illustrated embodiment, the sides 14B of the support 14 extend upward along opposite sides of the baluster B. The baluster B serves as backing for maintaining the sides 14B in position for engaging locking structure on the retainer 12, as will be described in further detail below. For the locking structure to work properly, it may be necessary for the baluster B to have a width or diameter about the same as the width of the base 14A or spacing between the sides 14B to provide proper backing of the sides 14B. Alternatively, the support 14 may be constructed to be non-dependent on the baluster B for providing backing. For example, the support 14 could support itself independent of the baluster B. The support 14 could have one, two, three, or four walls connected to each other along their heights or a continuous side wall extending around at least three sides of the baluster B (e.g., have a generally cup shape) which is capable of maintaining the generally vertical orientation of the support side walls independent from backing of the baluster.

Supports and retainers having other configurations may be used without departing from the scope of the present invention. For example, the retainer 12 and/or support 14 may be rounded in section instead of rectangular.

Figure 4:
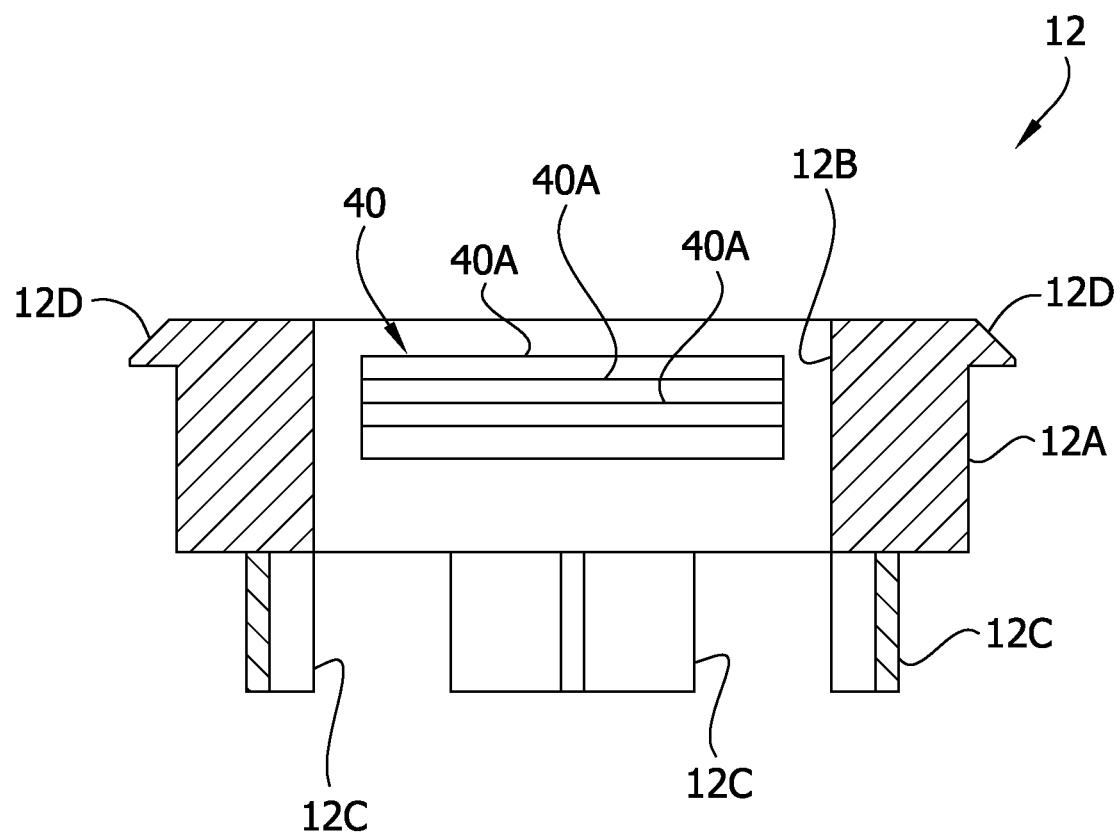
FIG. 4 is a section of the retainer taken in the plane including line 4-4 in FIG. 2.
Figure 5:
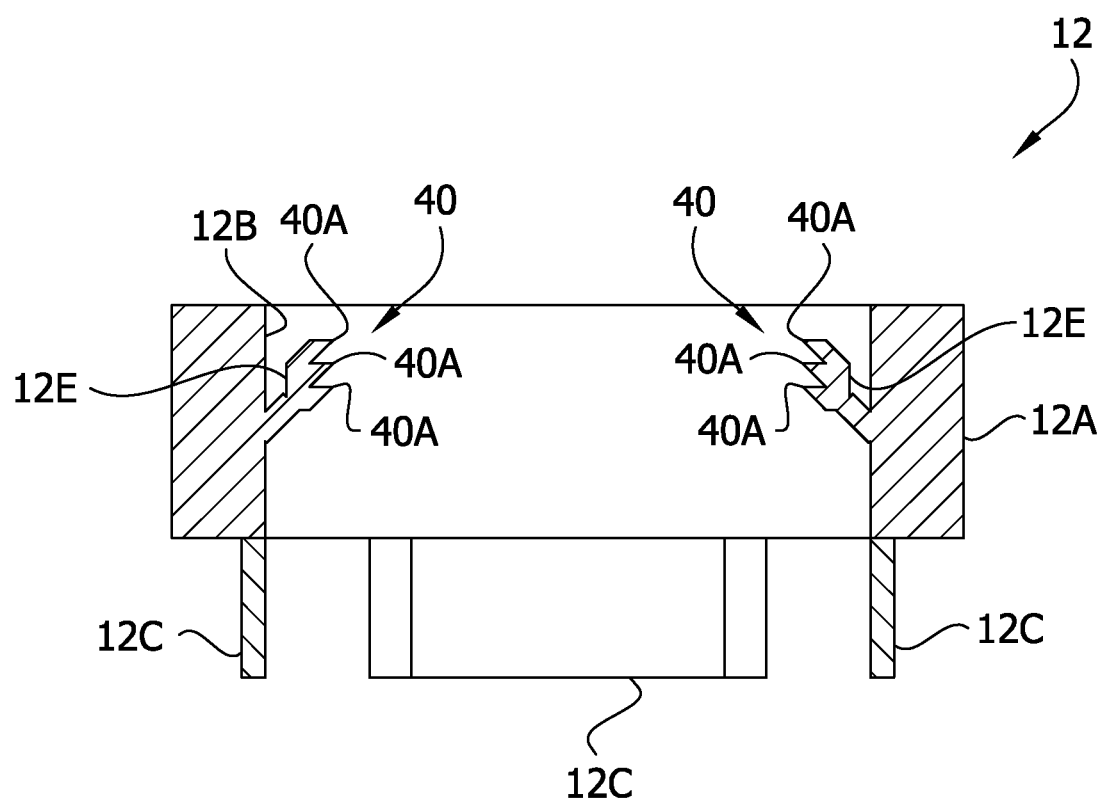
FIG. 5 is a section of the retainer taken in the plane including line 5-5 in FIG. 2.

Referring to FIGS. 4, 5, and 6A, the retainer 12 includes an insert including locating structure 12C configured for extending into the opening in the tread T for locating the retainer with respect to the opening. The insert projects below the frame and is sized for reception in the opening. In the illustrated embodiment, the locating structure is provided in the form of four flanges 12C extending downward from the frame. The flanges 12C have rounded outer surfaces for corresponding to a rounded (e.g., circular) opening in the tread T. Desirably, the flanges 12C define a diameter which corresponds to the diameter of the opening in which the connector 10 is to be used, to center the connector in the opening. The flanges 12C may not engage the inside of the opening without departing from the scope of the present invention.

The retainer 12 includes connection structure 12D adapted for engaging the cover 16 and securing the cover to the connector 10. In the illustrated embodiment, the connection structure 12D includes wedge-shaped projections or ribs 12D on opposite sides of the frame 12A. Connection of the cover 16 to the retainer 12 will be described in further detail below.

The retainer 12 and support 14 include respective securement surfaces 40, 42 configured for ratcheting engagement of the support and the retainer. The ratcheting engagement is non-rotational in the sense that it the support 14 does not need to be rotated (about its longitudinal axis) to move it with respect to the retainer 12. Rather, the support 14 is moved (e.g., pulled, pried, or pushed) upward along the direction in which its longitudinal axis extends without needing to rotate the support. Referring to FIGS. 2 and 3, the support 14 includes outward facing securement surfaces 42 on opposite outer surfaces of the sides 14B. Referring to FIGS. 4 and 5, the retainer includes inward facing securement surfaces 40 on opposite inner sides of the frame 12A. The securement surfaces 40, 42 are configured to permit upward movement of the support 14 in the opening 12B of the retainer 12 and to prevent downward movement of the support in the opening. In the illustrated embodiment, the securement surfaces 40, 42 include respective pluralities of wedge-shaped projections or teeth 40A, 42A oriented in opposite directions to achieve an irreversible ratcheting engagement of the support 14 and retainer 12. As shown in FIGS. 2 and 3, the sides 14B of the support 14 include the plurality of teeth 42A which are positioned along the height of the sides and extend along the width of the sides. As shown in FIGS. 4 and 5, the teeth 40A of the retainer 12 are provided on inward facing surfaces of arms 12E on the opposite inner sides of the frame 12A. The teeth 40A are provided one after another along the height of the arms 12E and extend along the width of the arms. The arms 12E project inwardly and upwardly with respect to the opening in the frame 12A. Securement surfaces having other ratcheting configurations (e.g., securement members other than teeth) may be used without departing from the scope of the present invention.

Figure 6B:
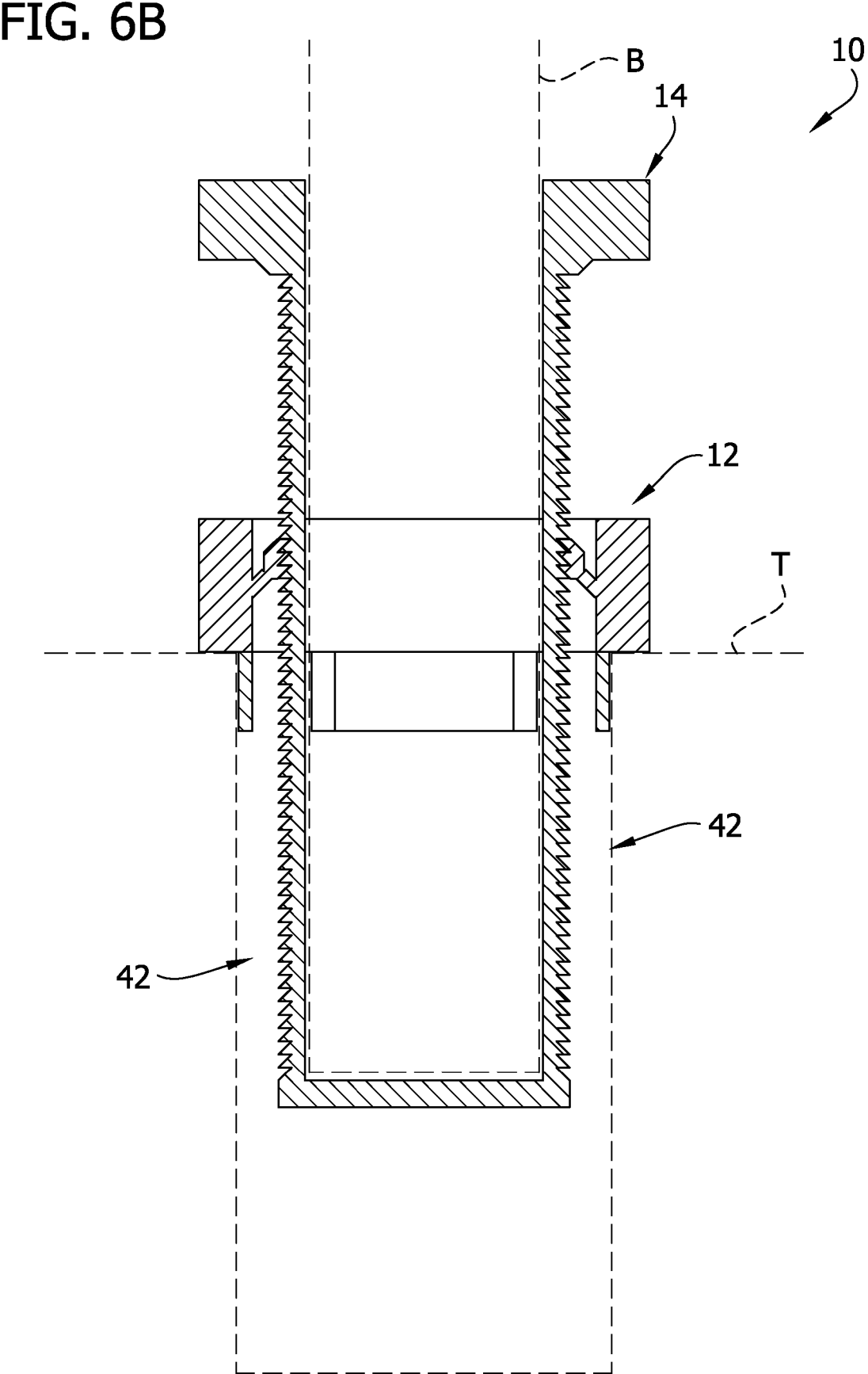
FIG. 6B is a view similar to FIG. 6A but showing the support in a raised position relative to the retainer.

The support 14 is shown engaged with the retainer in FIGS. 6A and 6B. In FIG. 6A, the support 14 is in a first or starting position with respect to the retainer 12. In FIG. 6B, the support 14 is in a second or raised position with respect to the retainer 12. As explained further below, during installation, it may be desirable to insert the bottom end of the baluster B relatively deeply into the opening in the tread T (e.g., FIG. 6A) and then raise the baluster to a raised or installed position (e.g., FIG. 6B). It will be understood that these positions are shown by way of example and not limitation. Various starting and raised positions may be used without departing from the scope of the present invention.

FIG. 7 illustrates in closer detail engagement of the teeth 42A of the support 14 with the teeth 40A of the retainer 12. The engagement of the teeth 42A, 40A of the support 14 and retainer 12 permits upward movement of the support with respect to the retainer and prevents downward movement of the support with respect to the retainer. The oppositely oriented teeth 40A, 42A of the retainer 12 and support 14 glide across each other to permit upward movement of the support, but lock against each other to prevent downward movement of the support. To facilitate upward movement of the support 12, lower ends of the arms 12E are connected to the frame 12A in such a way to permit deflection of the arms away from the support 14. The arms 12E are resiliently bendable about their connections with the frame 12A to form living hinges. The arms 12E may be described as each having a deflected position and a locking position. During upward movement of the support 14, engagement of inclined surfaces of the retainer teeth 40A with inclined surfaces of the support teeth 42A causes temporary deflection of the arms 12E to their deflected positions, in which the teeth of the retainer and support glide over each other. The arms 12E return to their locking position intermittently during upward movement of the support 14 and when upward movement of the support has ceased. In the locking position, the teeth 40A, 42A of the retainer 12 and support 14 engage each other to prevent downward movement (e.g., non-rotational downward movement) of the support with respect to the retainer.

In the illustrated embodiment, it may be necessary for the cavity 14C to be sized appropriately for the size of the baluster B such that the baluster provides backing for the securement surfaces 42 of the support for the teeth 42A, 40A to have the desired ratcheting engagement. However, as mentioned above, the support 14 may have other constructions such that backing of the securement surfaces 42 is not necessary for ratcheting engagement of the support 14 with the retainer 12.

In use, the support 14 may be positioned in a starting position in the opening 12B of the retainer 12 to assemble the connector 10. The lower end of the baluster B is inserted in the cavity 14C of the support 14. The connector 10 and lower end of the baluster B may then be positioned in an opening of the tread T. Desirably, the lower end of the baluster B is inserted far enough into the tread T to permit an upper end of the baluster to be positioned below and in register with a corresponding opening in a lower end of a handrail (not shown). The baluster B is moved into its installed position by raising the baluster upward, positioning the upper end of the baluster in the opening in the hand rail. This may be accomplished by actuating the connector 10 to force the bottom end of the baluster B upward, tending to move the bottom end of the baluster out of the opening in the tread T. The ratcheting engagement of the support 14 with the retainer 12 permits upward movement of the bottom end of the baluster B in the opening in the tread T tending to withdraw the baluster from the opening in the tread and prevents movement of the baluster downward tending to advance the baluster farther into the opening in the tread. Thus, the connector 10 maintains the upper end of the baluster B firmly in position in the handrail and in the tread T.

Figure 8:
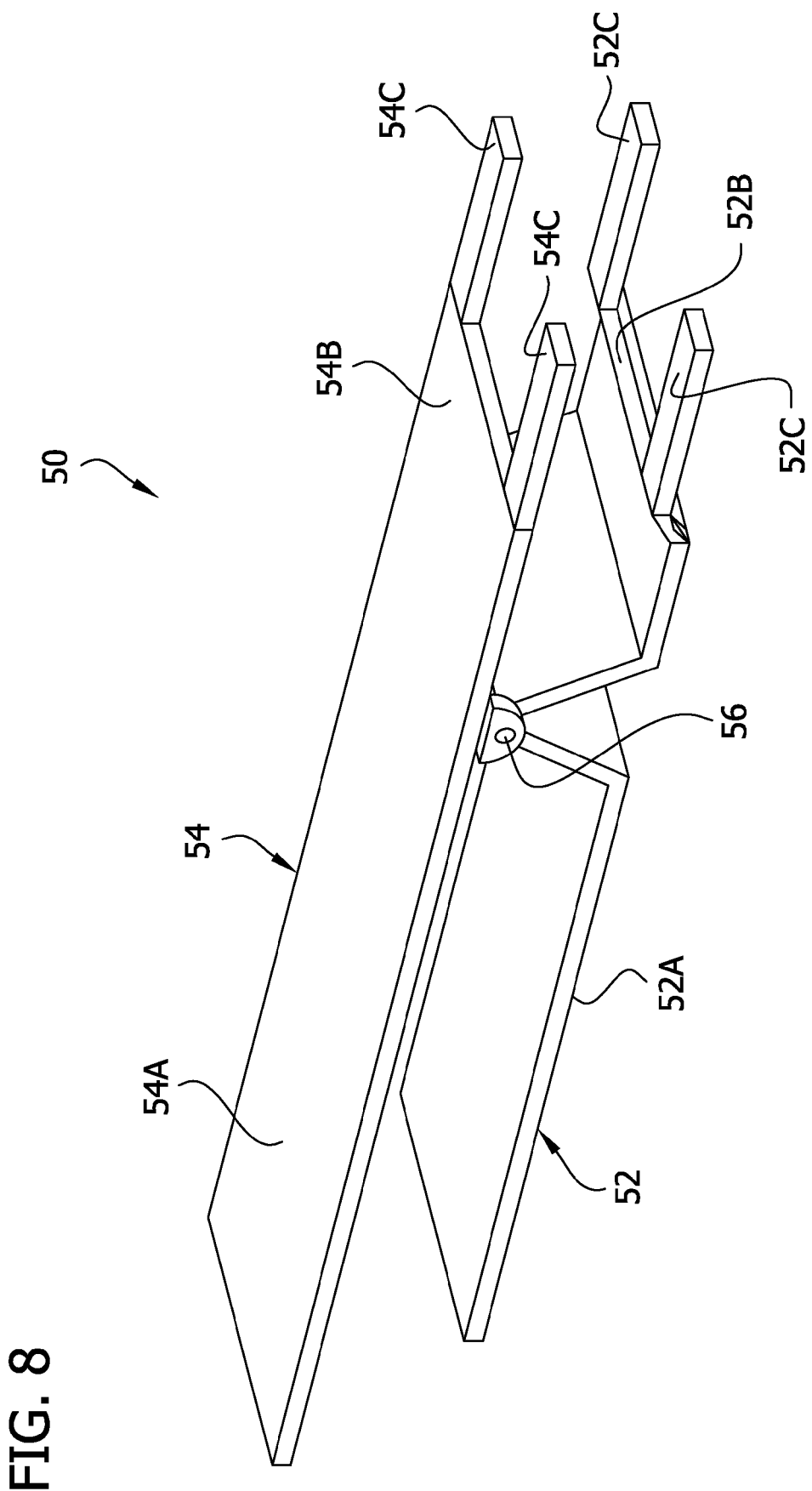
FIG. 8 is a perspective of an actuator configured for actuating the connector.

A tool which may be used to actuate the connector to raise the support is illustrated in FIG. 8 and generally designated by the reference number 50. The tool 50 includes a base 52 and a fulcrum 54. The tool 50 also includes a pivot connection 56 between the base 52 and the fulcrum 54. In general, the tool 50 may be used by engaging the base 52 with the retainer 12, engaging the fulcrum 54 with the support 14, and pivoting the fulcrum with respect to the base. An example use of the tool 50 to actuate the connector 10 is illustrated in sequence in FIGS. 9A and 9B. The base 52 maintains the retainer 12 in position with respect to the opening in the tread T, and the fulcrum 54 raises the support 14 to bring the lower end of the baluster B to the desired vertical position in the opening in the tread.

Referring again to FIG. 8, the base 52 includes a bottom surface 52A adapted for engaging or resting on the tread T and includes a connector engagement portion 52B. In FIG. 9A, the bottom surface 52A is shown above the top surface of the tread T. It will be understood the tool 50 can be suitably modified (e.g., by lowering the base) or shims could be used such that the bottom surface 52A of the base 52 engages the top surface of the tread T for providing a bearing surface for the tool. The fulcrum 54 includes a handle 54A on its proximal end on one side of the pivot connection 56 and includes a connector engagement portion 54B on its distal end on the other side of the pivot connection. In the illustrated embodiment, the engagement portions 52B, 54B of the base and fulcrum include respective pairs of fingers 52C, 54C. The fingers 52C, 54C of each pair are spaced sufficiently from each other to accommodate the sides 14B of the support 14 and the bottom end of the baluster B between the fingers. In use, the fingers 52C of the base 52 are positioned on opposite sides of the baluster B and engage the retainer 12. In the illustrated embodiment, the fingers 52C engage the top of the frame 12A. The fingers 54C of the fulcrum 54 are also positioned on opposite sides of the baluster B and support 14. The fingers 54C of the fulcrum 54 engage lower sides of the shoulders 14D of the support. Downward force applied to the handle 54A of the fulcrum 54 causes the fulcrum to pivot about the pivot connection 56 and the fingers 54C to raise the support by engagement with the shoulders 14D. At the same time, the downward force on the handle 54A of the fulcrum 54 translates into downward force on the fingers 52C of the base 52 on the retainer 12 to prevent the retainer from moving upward with the support 14. Tools having other configurations may be used for actuating the connector 10 without departing from the scope of the present invention.

Figure 13B:
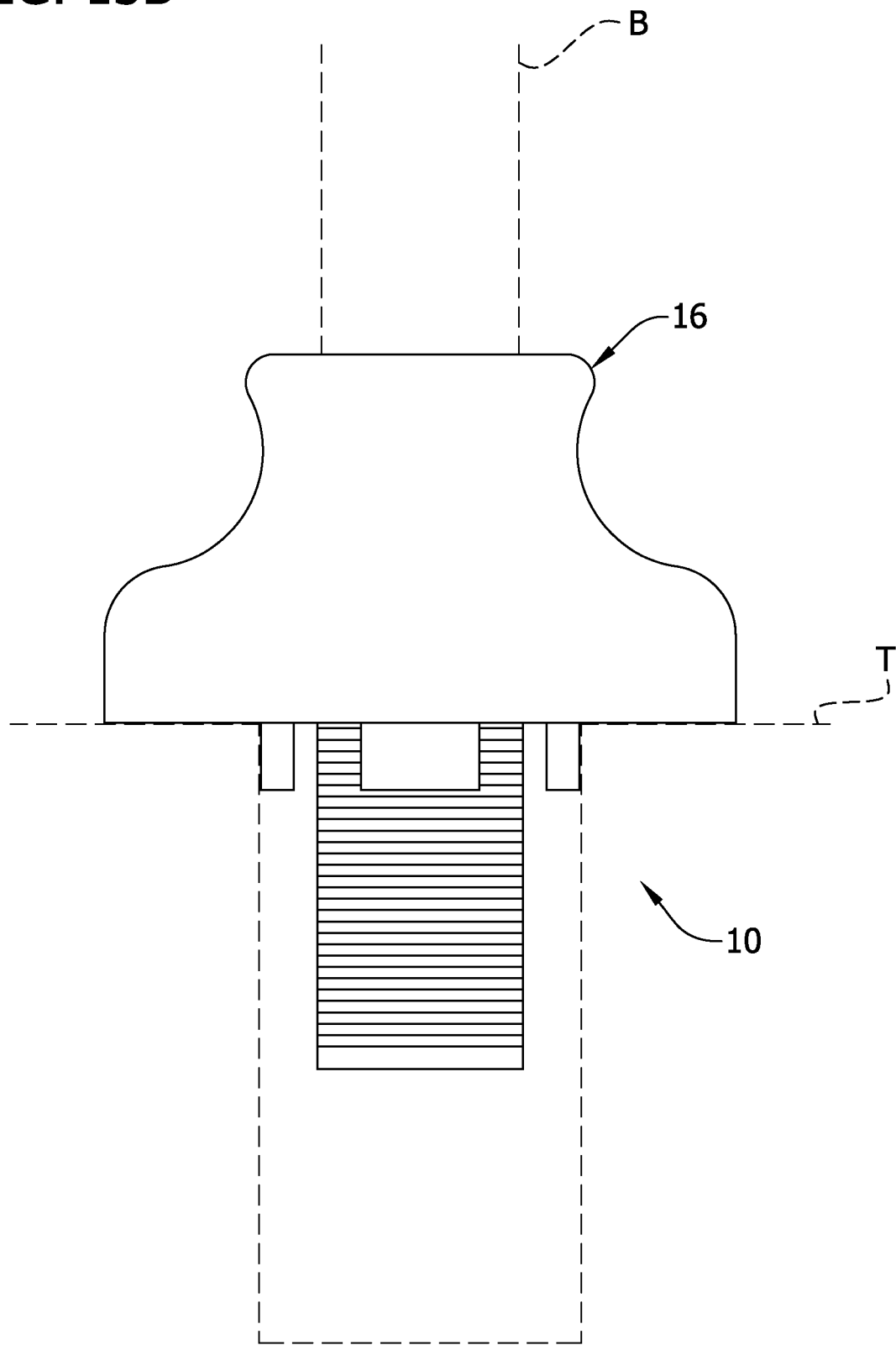
FIG. 13B is an elevation of the connector and cover engaged with each other.

After the baluster B is moved to its raised or installed position (after the connector 10 is actuated), it may be desirable to conceal the connection of the baluster B with the tread T. For example, FIG. 13B illustrates the cover 16 being installed over the connector 10. It may be necessary to prepare the connector 10 for mounting of the cover 16. In the illustrated embodiment, it is desirable to cut or trim upper ends of the sides 14B of the support 14 so the sides do not interfere with mounting of the cover on the connector 10.

Figure 10:
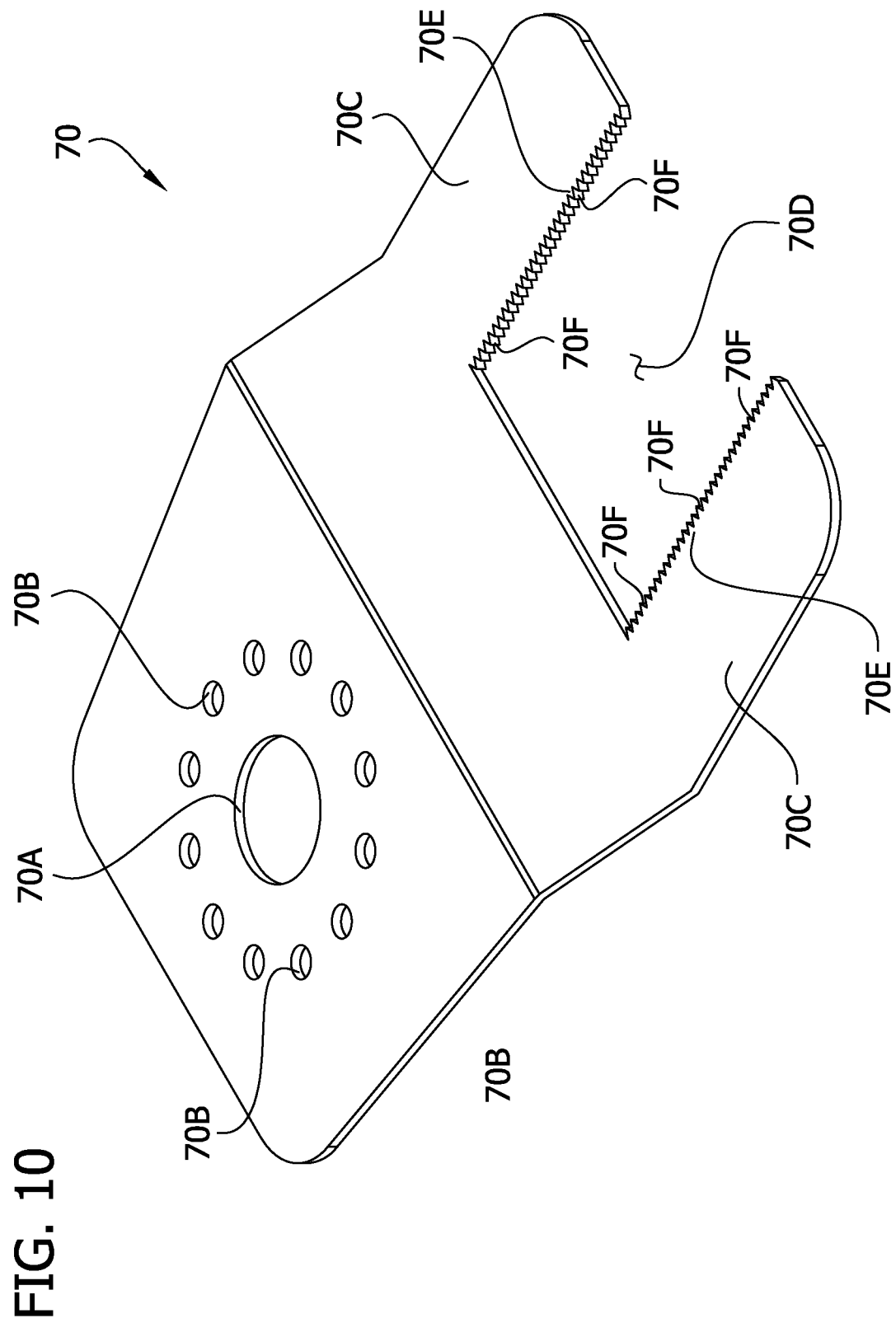
FIG. 10 is a perspective of a vibratory bit configured for use with a vibratory tool.

FIG. 10 illustrates a vibratory bit 70 of the installation system of the present invention. The vibratory bit 70 is configured for trimming the upper ends of the sides 14B from the support 14. The vibratory bit 70 is adapted for use with a vibratory tool, which may also be referred to as a "multi tool" (not shown). Persons having ordinary skill in the art are familiar with such vibratory tools and would understand the tools include a head which is adapted for mounting of various bits for use in a variety of tasks. For mounting the vibratory bit 70 on a tool, the bit includes a connection end having a primary mounting opening 70A and a plurality of secondary mounting openings 70B. The bit 70 includes a cutting end opposite the connection end. The cutting end includes two fingers 70C. The fingers define a generally U-shaped recess 70D in the cutting end. Each of the fingers 70C includes a blade 70E, and each blade includes a plurality of cutting teeth 70F. The blades 70E are oriented toward each other or face each other. In the illustrated embodiment, the blades 70E are generally parallel to each other and lie in the same plane.

Figure 11:
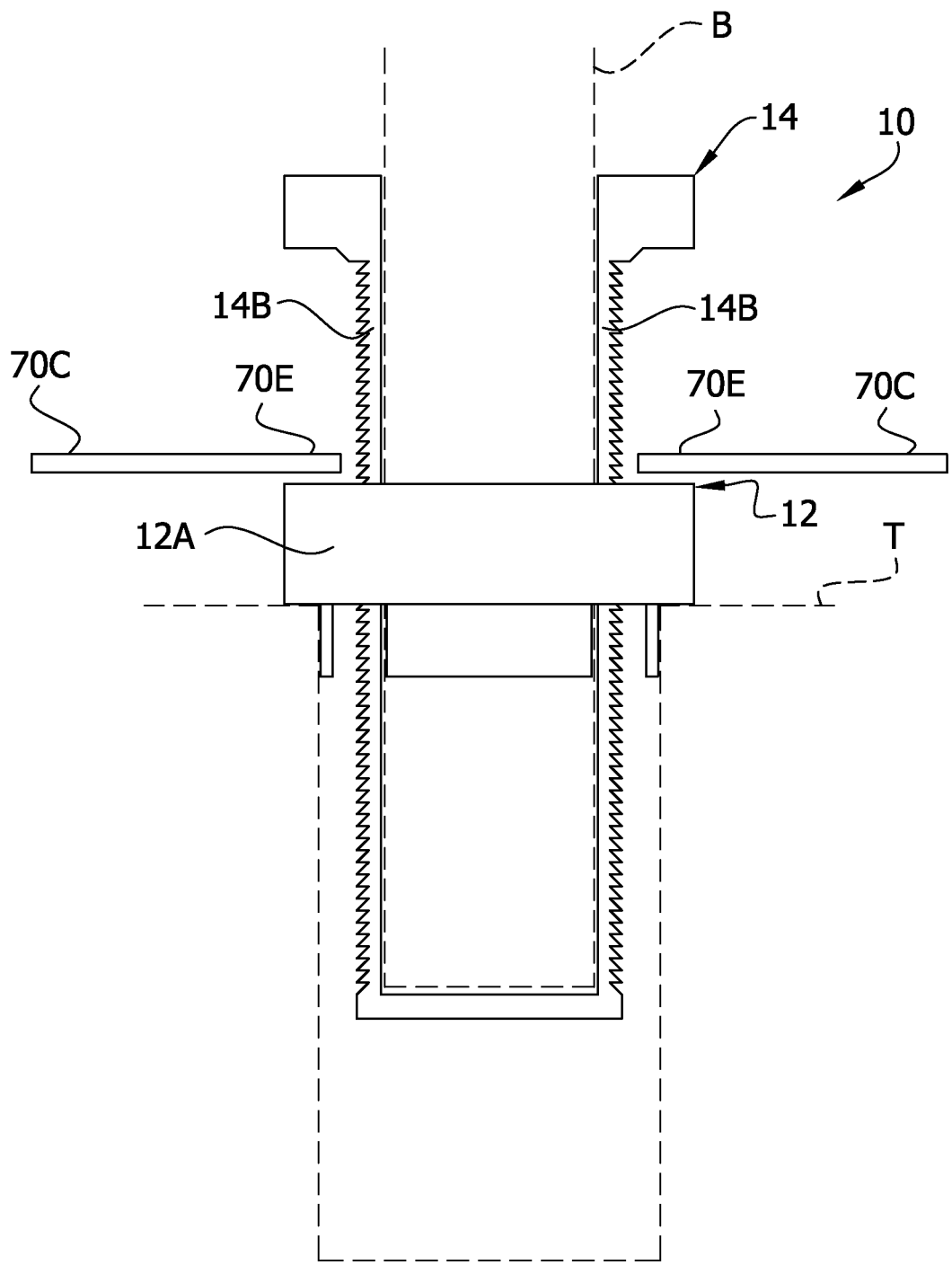
FIG. 11 is an elevation of the connector having the support shown in the raised position, the vibratory bit being shown schematically on opposite sides of the connector.
Figure 12:
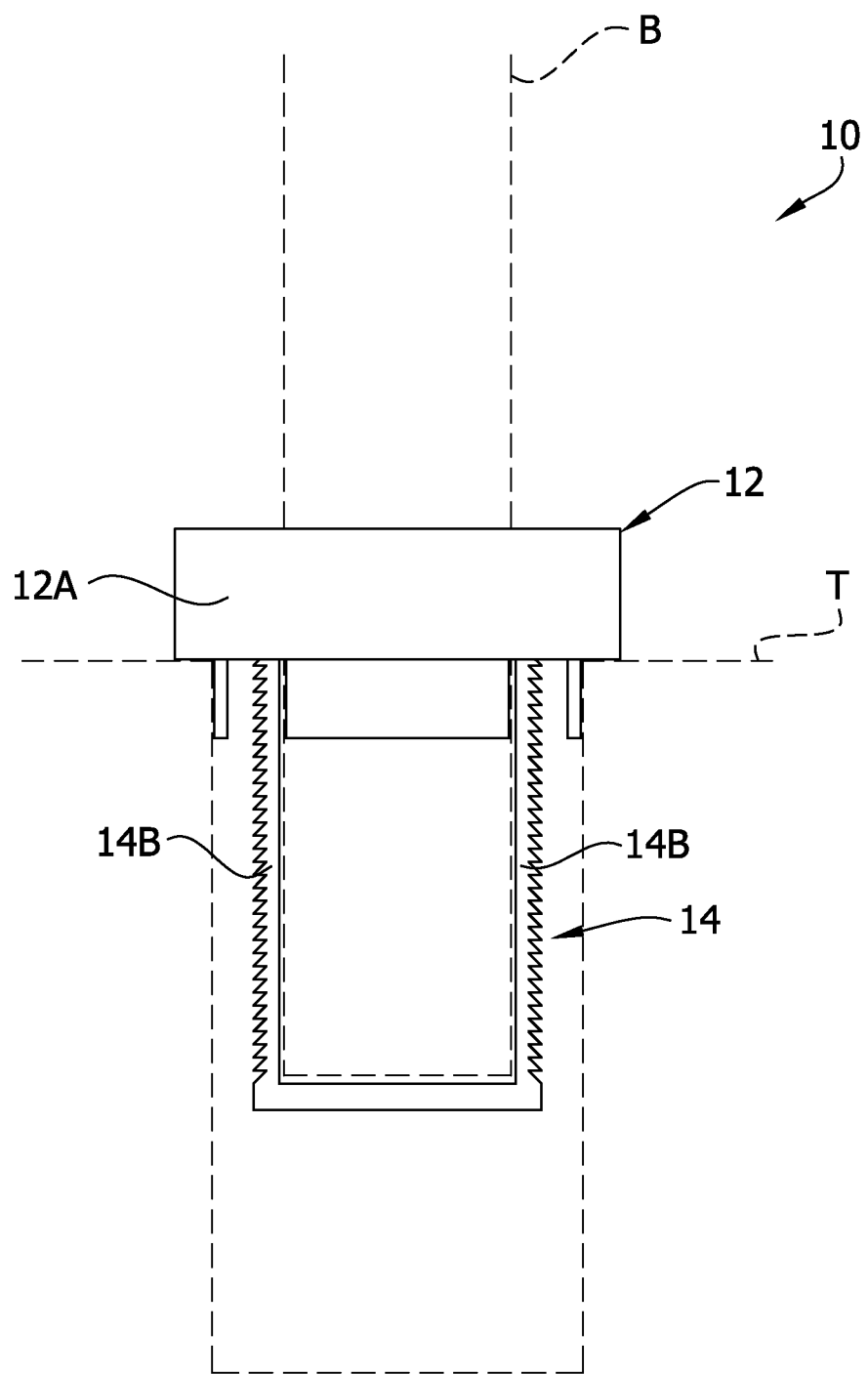
FIG. 12 is a view similar to FIG. 11 but showing portions of the support removed as if cut away by the vibratory bit.

FIG. 11 schematically illustrates the fingers 70C of the bit 70 on opposite sides of the baluster B and support 14. The upper ends of the sides 14B exposed above the retainer 12 may be trimmed by moving the bit 70 from side to side (e.g., first to the left then to the right) to engage the cutting blades 70E with respective sides of the support. Desirably, care is taken to avoid substantial contact of the cutting blades 70E with the baluster B. FIG. 12 illustrates the connector 10 after the upper ends of the support 14 have been removed.

After the support 14 has been trimmed, the cover 16 is mounted on the connector 10. The cover 16 may be referred to a "shoe" and may have a tubular construction including a decorative or aesthetically pleasing outer profile. Desirably, the cover 16 is threaded onto the baluster B before the baluster is connected to the tread T. Thus, after connection of the baluster B to the tread T, the cover 16 can be slid downward on the baluster onto the connector 10, as shown in sequence in FIGS. 13A and 13B.

Figure 13C:
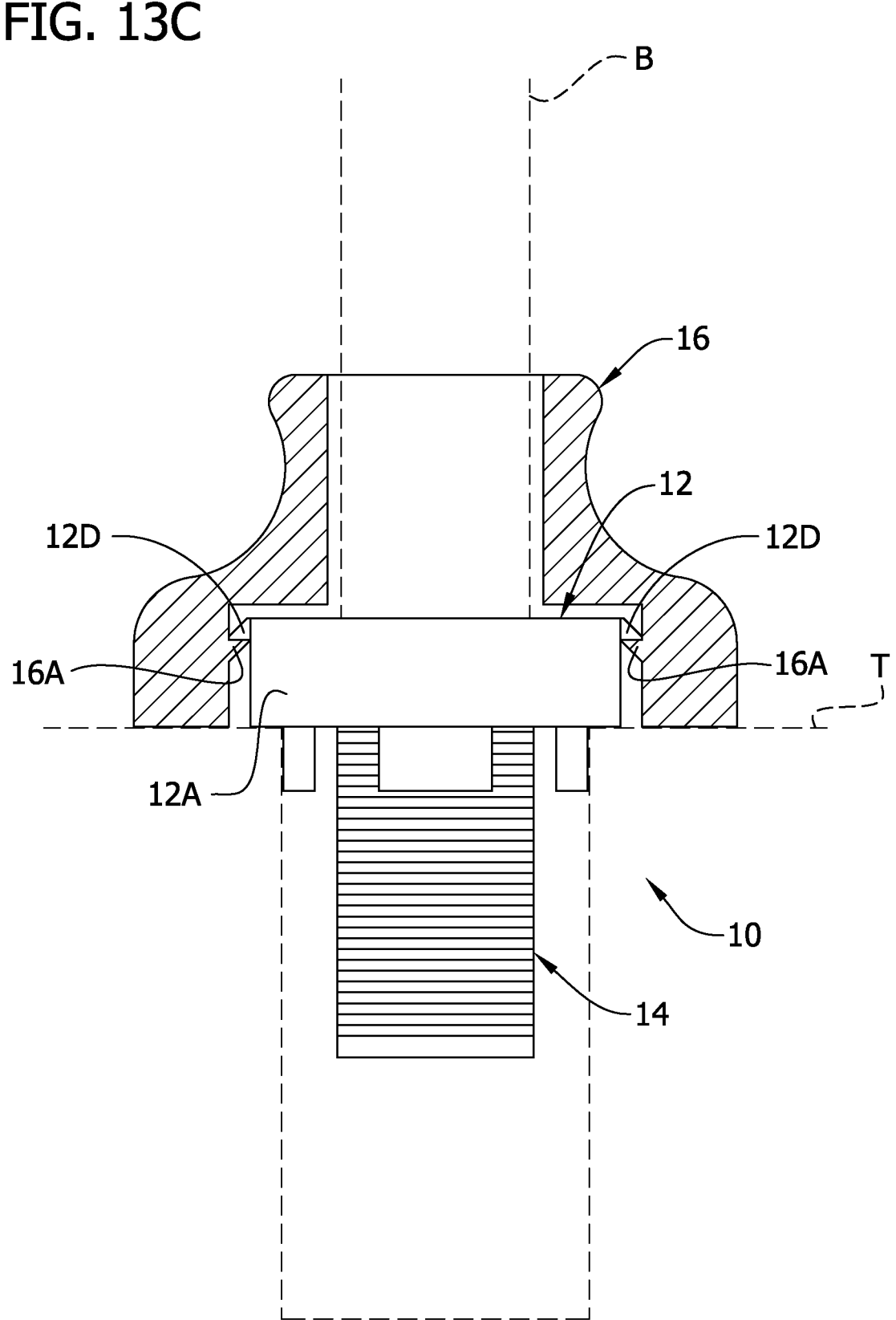
FIG. 13C is an elevation similar to FIG. 13B but showing the cover in section to show engagement of the cover with the connector.

In the illustrated embodiment, the cover 16 includes connection structure 16A for securing the cover on the connector 10. As shown in FIG. 13C, the cover 16 includes internal ribs 16A corresponding to the ribs 12D on the retainer 12. The ribs 16A are configured for permitting the cover 16 to be slid downward onto the connector 10 and preventing the cover from then being raised upward from the connector. The engagement of the cover 16 and connector 10 may form a releasable connection or substantially irreversible connection (e.g., requiring destruction of the cover). Desirably, the covering of the connector 10 by the cover 16 completes installation of the baluster B.

The methods, connector, and tools disclosed herein present significant advantages over prior techniques. For example, the use of epoxies, adhesives, or other agents may not be necessary for securing the balusters in the hand rail or treads. The ratcheting connector 10 may securely maintain the baluster B in its desired position in the openings in the hand rail and tread. Moreover, given the range of vertical adjustment of the connector 10, the balusters B may not need to be trimmed to length with as much precision as in conventional techniques. For example, the balusters may be trimmed to within about a two inch range of the desired length. In addition, the methods, connector, and tools of the present invention are less expensive, easier to use, and more efficient than conventional techniques.

Figure 14:
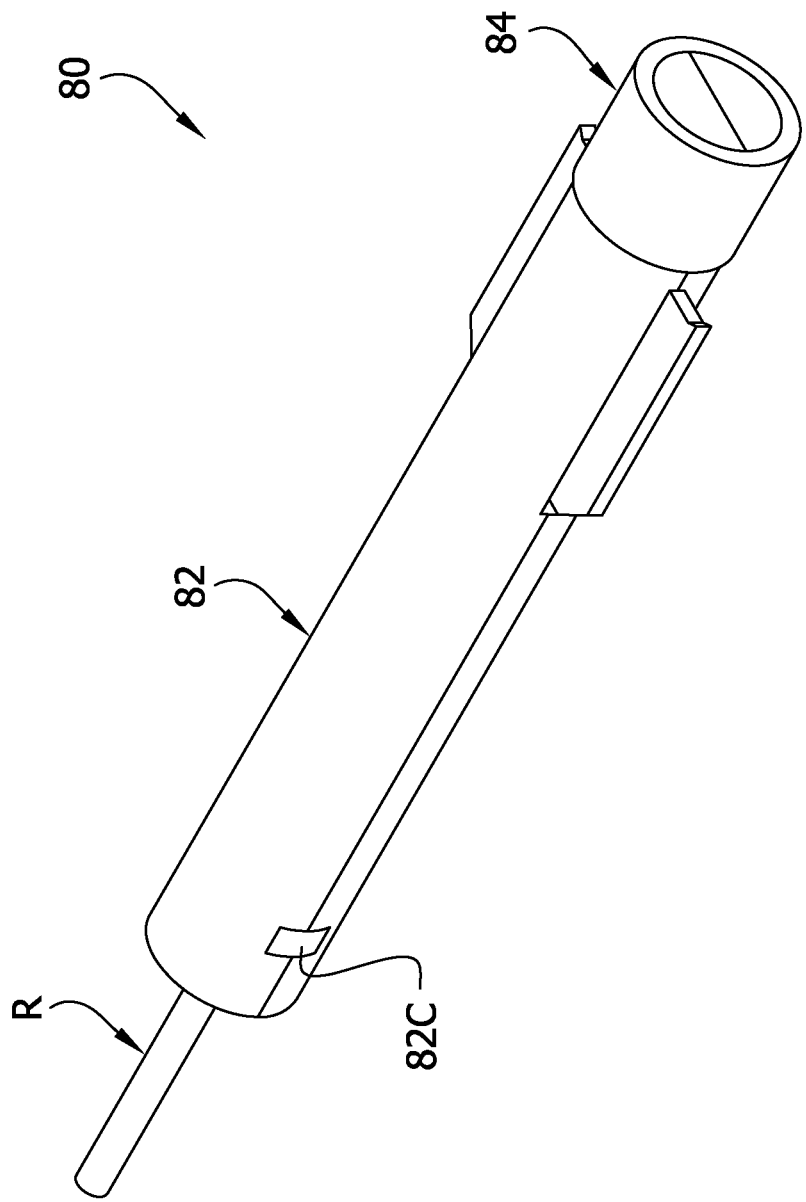
FIG. 14 is a perspective of a rotary drill bit adaptor on a rotary bit.

In some circumstances, it may be necessary to enlarge an existing opening in a tread T for receiving the bottom end of a baluster B. For example, if an existing balustrade of a stairway is to be retrofitted with new balusters (e.g., metal balusters in place of wood balusters), it may be necessary to enlarge the openings in the treads T. A rotary bit adaptor of the present invention is illustrated in FIG. 14 and indicated generally by the reference number 80. The bit adaptor 80 is configured for being mounted on a rotary bit R (e.g., rotary bit or paddle bit) and for centering the rotary bit in an existing hole for enlarging the existing hole on center. In the illustrated embodiment, the bit adaptor 80 is configured for use with a spade bit or paddle bit R. The spade bit R includes a shaft having a first end adapted for reception in a chuck of a drill and an opposite end connected to a bit head. The head includes shoulders adjacent where the head is connected to the shaft and a tapered tip and cutting blades extending laterally with respect to the tip on the end opposite the shoulders. The head includes opposite sides extending between the shoulders and the cutting blades and generally flat faces extending between the sides. The head has a width extending between the sides across the face and a thickness between the faces. Other types of rotary bits may be used without departing from the scope of the present invention. Moreover, the bit and adaptor may be used to enlarge openings for other purposes than baluster installation without departing from the scope of the present invention.

Figure 16:
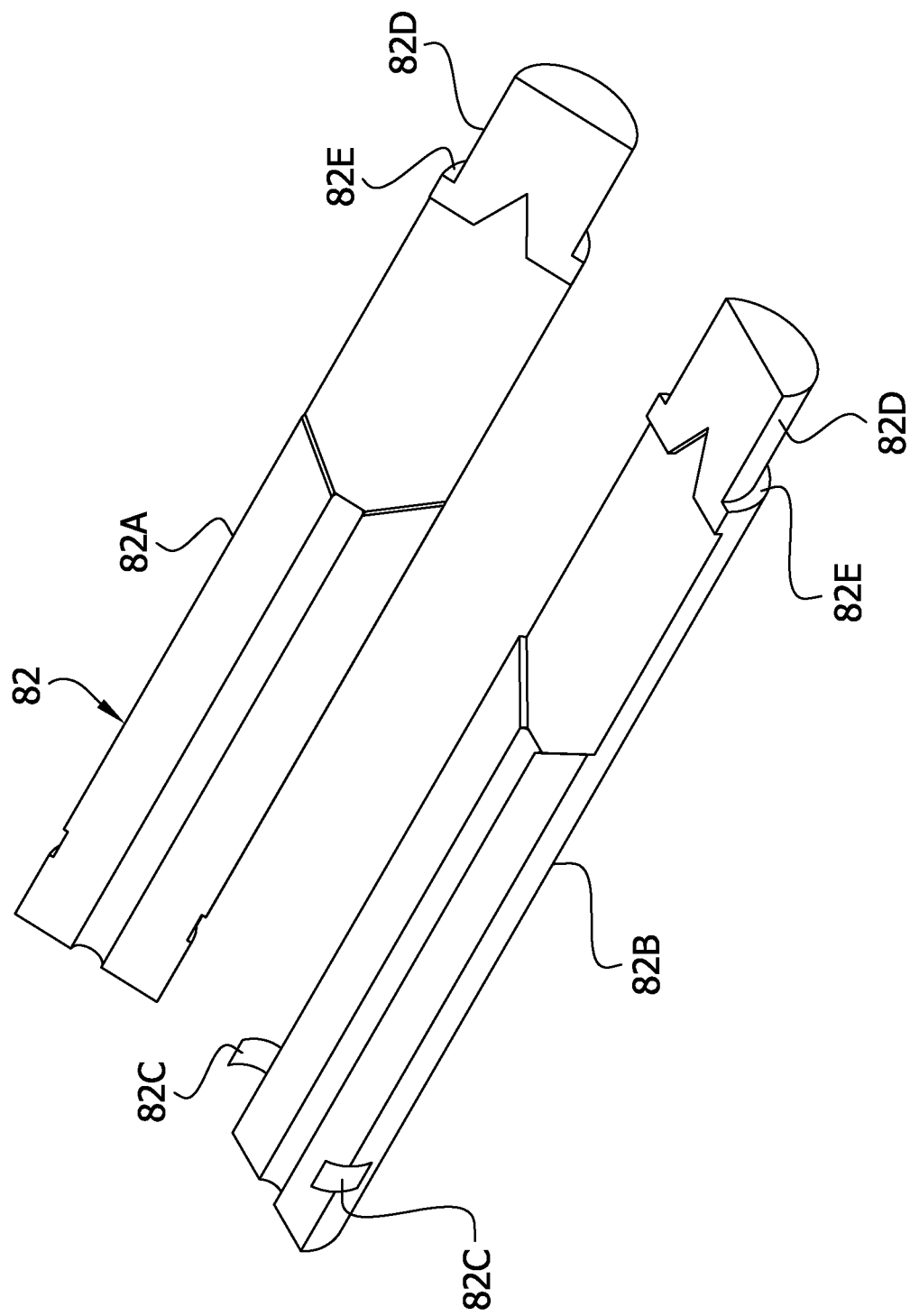
FIG. 16 is a perspective of portions of the mount of the adaptor removed from the rotary bit.

As shown in FIG. 14, the bit adaptor 80 includes a mount 82 and a guide 84. In general, the mount 82 is mounted on the rotary bit R, the guide 84 is installed on the mount 82, and the adaptor 80 and rotary bit are positioned in and rotated in an opening to enlarge it. The mount 82 is configured for receiving the rotary bit R. Cutting blades of the rotary bit R extend outward from the outer surface of the main body 82. As shown in FIG. 16, in the illustrated embodiment, the mount 82 includes a main body having a clamshell construction including first and second body parts 82A, 82B. The body parts 82A, 82B have inner surfaces including recesses corresponding to and sized and shaped for receiving the rotary bit R. The mount 82 may be configured for receiving rotary bits R of different sizes. For example, the recesses in the body parts 82A, 82B may be configured to receive rotary bits of different sizes. Thus, the mount 82 may be used with multiple rotary bits of different size according to the desired enlarged size of the opening.

The mount 82 may include at least one fastener 82C for securing the body parts 82A, 82B together on the rotary bit. The illustrated embodiment includes two clips 82C. Other numbers of fasteners and other types of fasteners (e.g., clamps, screws, connectors, threaded members, etc.) may be used without departing from the scope of the present invention. Moreover, the body parts 82A, 82B may be connected to each other by a hinge or pivot connection (e.g., along sides or at ends of the body parts) which permits opening of the main body for inserting and removing the rotary bit. Alternatively, the main body of the mount 82 may not have a clamshell construction (e.g., be formed as a single piece) and be mountable on the rotary bit by "snap" or friction fit or other suitable connection.

Figure 15:
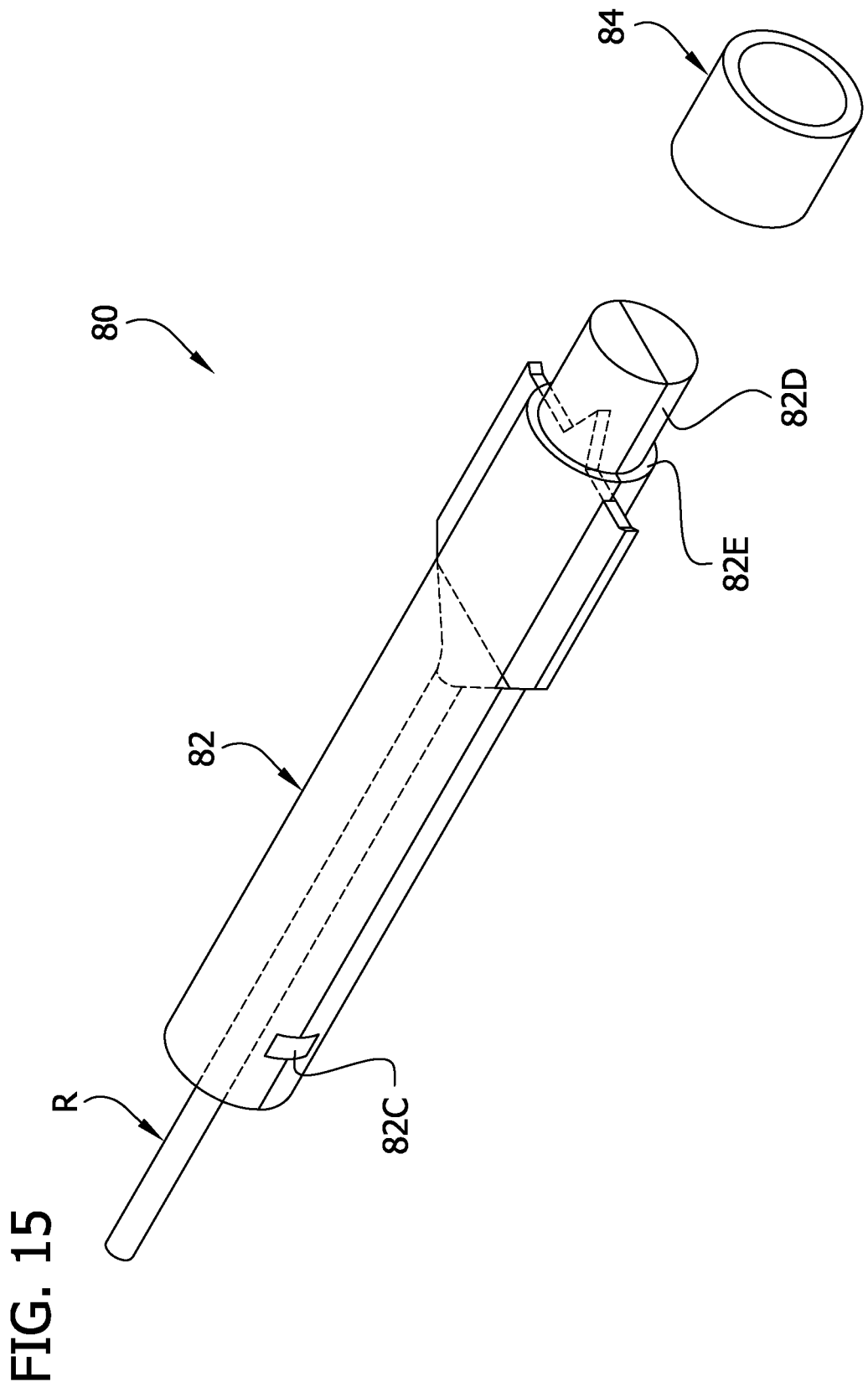
FIG. 15 is a view similar to FIG. 14 but showing a guide of the adaptor removed from a mount of the adaptor.

As shown in FIG. 15, the guide 84 is removable from a guide receiver including a circumferential recess 82D on a distal end of the mount 82. The mount 82 includes a shoulder 82E adjacent the guide receiver for engaging the guide 84 to maintain the guide in position adjacent the distal end of the mount 82. In the illustrated embodiment, the guide 84 comprises a bushing or tubular segment having an inside diameter, a wall thickness, and an outside diameter. Various configurations and sizes of guides may be used. For example, as described in further detail below, a plurality of guides 84 having different sizes may be provided. For example, guides 84 in a set of guides may each have the same internal diameter corresponding to the outside diameter of the circumferential recess 82D of the guide receiver. The guides 84 may have different wall thicknesses to provide different outside diameters. In use, a particular guide 84 is chosen according to the diameter of the existing hole to be enlarged and the outside diameter of the guide. Desirably, the outside diameter of the guide 84 is about the same as or slightly less than the diameter of the existing opening in the tread. The mount 82 is configured so when mounted on the rotary bit R the longitudinal axis of the guide receiver (and thus the longitudinal axis of the guide 84) is parallel to and in register with the longitudinal axis of the rotary bit R.

Figure 17:
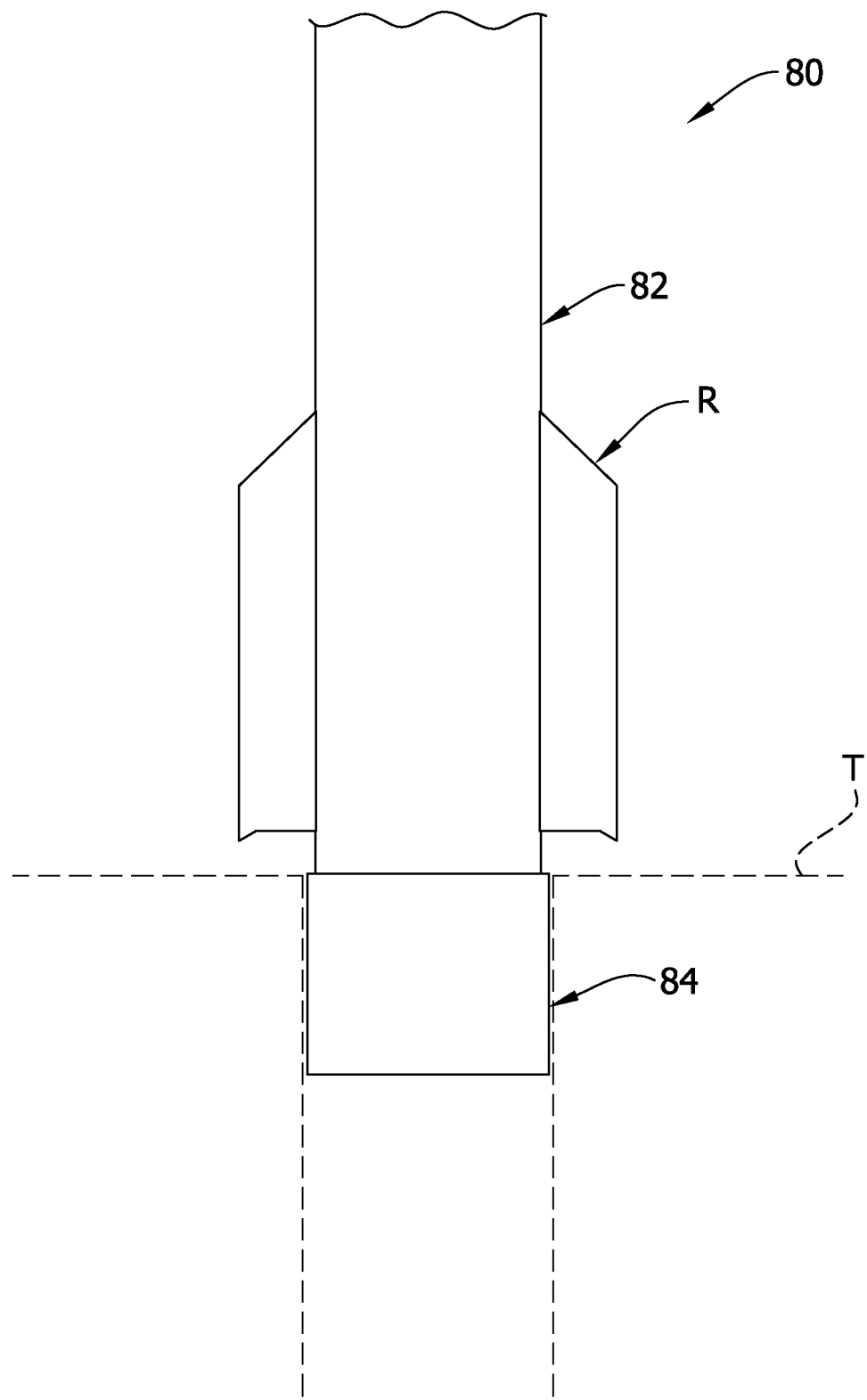
FIG. 17 is an elevation of a lower end of the rotary bit adaptor on a rotary bit positioned in register with an opening before being used to enlarge the opening.

FIG. 17 illustrates the adaptor 80 on the rotary bit R positioned in register with an existing opening in a tread T before use of the rotary bit and adaptor to enlarge the opening. The guide 84 has a size corresponding to the size of the existing opening to center the rotary bit R in the opening. When the rotary bit R is rotated (e.g., by a drill) and advanced into the existing opening, the blades of the rotary bit cut the tread T to enlarge the existing hole. The blades of the rotary bit R extend outward beyond the guide 84 so outer portions of the blades cut the tread T. Because the adaptor 80 centers the rotary bit in the existing opening, the circumference of the enlarged opening will be concentric with the circumference of the existing opening.

It will be understood the bit adaptor 80 may have other configurations without departing from the scope of the present invention. For example, the guide 84 may be formed as part of the mount 82. Instead of using a mount 82 capable of receiving a plurality of different guides 84, a plurality of mounts may be provided, each of which has a different diameter guide adjacent its distal end. One of the mounts may be selected from the plurality according to the diameter of its guide and the size of the opening to be enlarged. Desirably, the selected mount has a guide adjacent its distal end which is about the same as or slightly less than the diameter of the existing opening to center the rotary bit in the opening.

Figure 18:
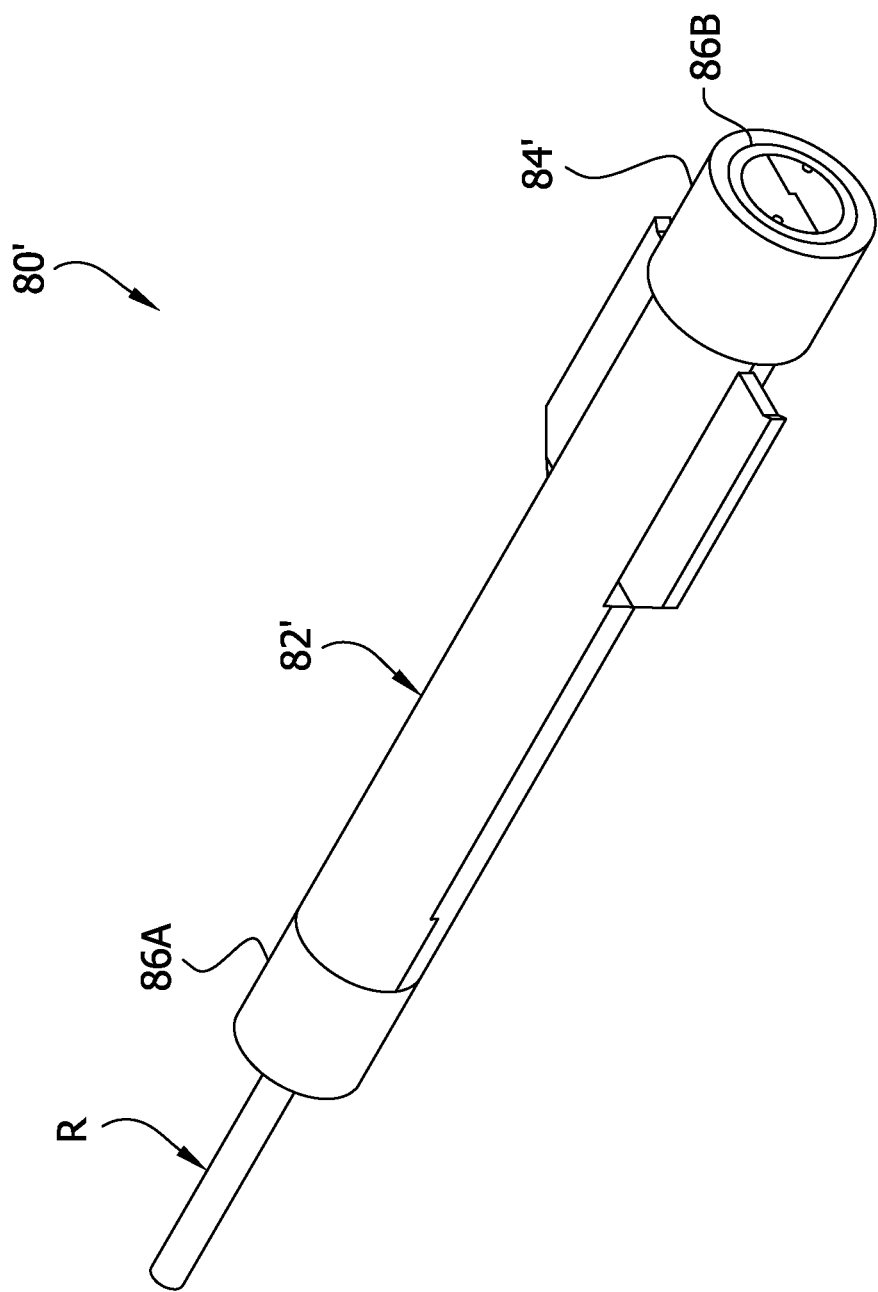
FIG. 18 is a perspective of a second embodiment of a rotary drill bit adaptor on a rotary bit.
Figure 19:
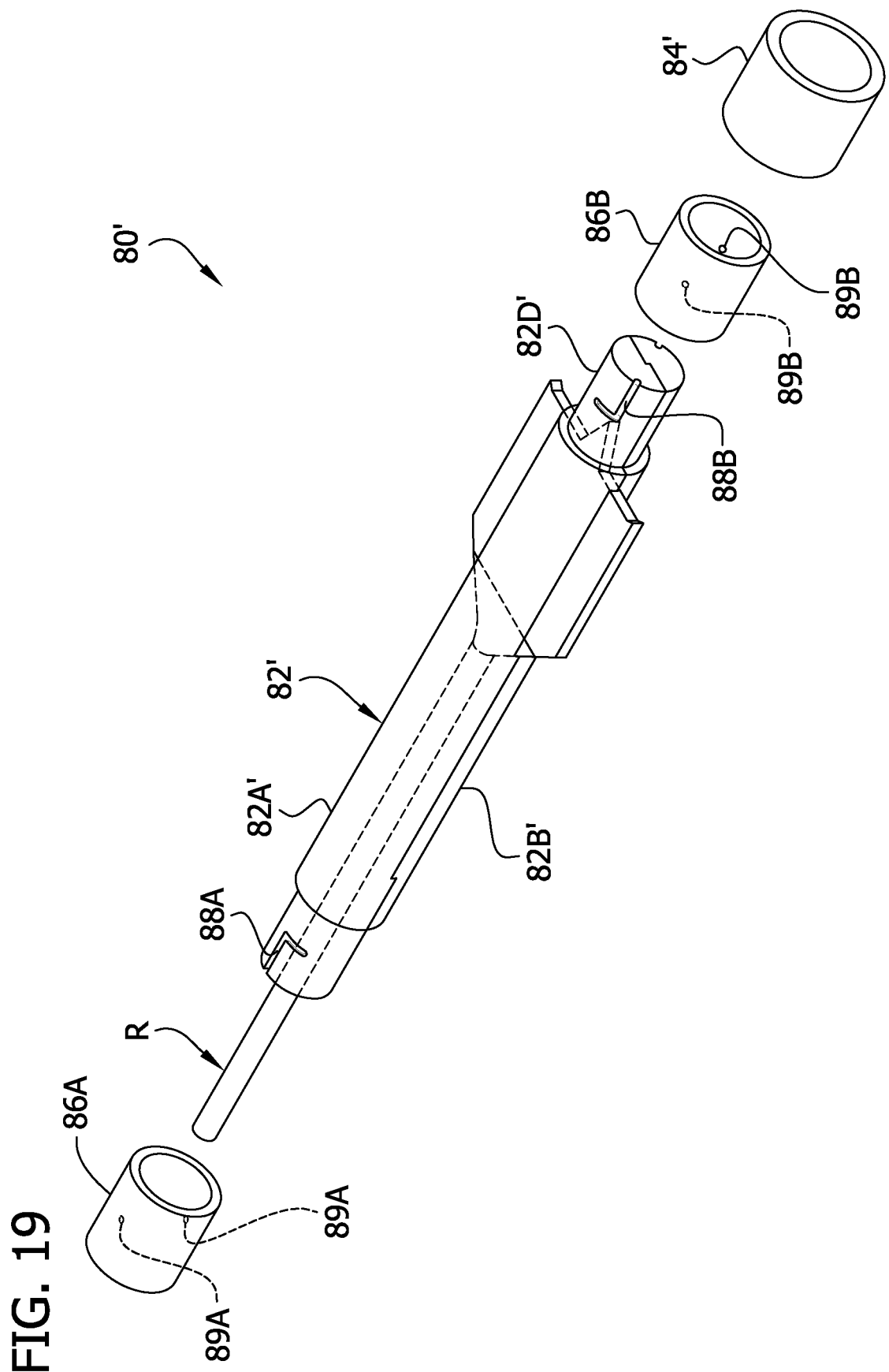
FIG. 19 is a view similar to FIG. 18 but showing a guide and fasteners of the adaptor removed from a body of the adaptor.

Referring to FIGS. 18 and 19, a second embodiment of a rotary bit adaptor of the present invention is indicated generally by the reference number 80'. The bit adaptor 80' is identical to the adaptor 80 except as described hereafter and may be used with a rotary bit R as described above. Corresponding parts are designated with corresponding reference numbers, plus a prime indicator. For example, the bit adaptor 80' includes a mount 82' and a guide 84'. In addition, the mount 82' includes body parts 82A', 82B'. In this embodiment, the bit adaptor 80' includes fasteners in the form of proximal and distal bushings 86A, 86B for securing the body parts 82A', 82B' together (e.g., instead of the fasteners 82C described above). The bushings 86A, 86B are receivable on respective proximal and distal ends of the mount 82'. As shown in FIG. 19, the proximal end of the mount 82' includes a circumferential recess for receiving the proximal bushing 86A. The distal bushing 86B is receivable on the circumferential recess of the guide receiver 82D' at the distal end of the mount 82'. The bushings 86A, 86B have an inner diameter about the same as the outer diameter of respective portions of the mount 82' on which the bushings are receivable.

The bushings 86A, 86B and body of the mount 82' are configured for rotational locking engagement of the bushings on the body. In the illustrated embodiment, the body of the mount 82' and bushings 86A, 86B are configured for threaded rotational locking engagement. More particularly, as shown in FIG. 19, the body includes channels 88A, 88B on opposite sides (only one side being shown) of the body at the proximal and distal ends of the body configured for receiving protrusions 89A, 89B on inner surfaces of the bushings. The bushings 86A, 86B are received onto respective ends of the main body 82' by positioning the protrusions 89A, 89B in register with the channels 88A, 88B and threading the protrusions into the channels. Each channel 88A, 88B includes two channel portions. The first channel portion extends generally along the longitudinal axis of the main body, and the second channel portion extends generally radially or circumferentially along the body of the mount 82'. When the bushing protrusions 89A, 89B are threaded in the channels 88A, 88B, the first channel portions permit sliding movement of the bushings 86A, 86B generally axially with respect to the body or along the longitudinal axis of the body. The first channel portions have sufficient depth to permit generally free sliding movement of the bushing protrusions along the first channel portions. The bushings 86A, 86B are moved to a locked position by rotating the bushings to move the inner protrusions 89A, 89B along the second portions of the channels 88A, 88B. The second channel portions are relatively deep adjacent the first channel portions and become shallower as the second portions extend away from the first portions. Accordingly, as the bushings 86A, 86B are rotated, the protrusions 89A, 89B in the second channel portions encounter increasing frictional engagement in the channels 88A, 88B. Desirably, the bushings 86A, 86B are rotated sufficiently such that the engagement of the protrusions 89A, 89B with the second channel portions secure or "lock" the body parts 82A', 82B' together. Such a rotational locking engagement may enable the adaptor 80' to accommodate rotary bits R having different shapes and sizes because the body parts 82A', 82B' are clamped onto the rotary bit by the rotational locking. For example, if a shaft of a rotary bit R is relatively small, the bushings 86A, 86B may need to be rotated farther to encounter sufficient frictional engagement to lock the body parts in place than if the shaft of the rotary bit were relatively large.

Other configurations for rotational locking engagement of the fasteners such as bushings 86A, 86B may be used without departing from the scope of the present invention. For example, the body of the mount 82' may have a channel or thread extending in multiple turns around the circumference of the main body, and the bushings 86A, 86B may have a thread which extends in multiple turns around the inner circumference of the bushings. The thread on the body and/or the thread on the bushings 86A, 86B may be adapted such that the bushing secures or "locks" the body parts together by encountering increasing frictional engagement with the body as the bushing is rotated farther onto the body. For example, the thread or channel on the body may become wider or shallower/narrower to provide increasing friction with the thread on the bushing.

In this embodiment, the guide 84' is receivable over the distal bushing 86B. The distal bushing 86B forms the guide receiver. The guide 84' may be secured or fastened over the bushing 86B in various suitable ways. For example, the distal bushing 86B may be magnetized and the guide 84' may be maintained on the bushing by magnetic attraction to the distal bushing. For example, the guide 84' may be formed of steel. An auxiliary guide (not shown), such as a guide have a different size or length, may be stored on the adaptor 80'. For example, the auxiliary guide may be received over the proximal bushing 86A. The proximal bushing 86A may be mag-netized for maintaining the auxiliary guide (e.g., formed of steel) in place on the proximal bushing by magnetic attraction. Thus, a guide having a different outer diameter or a different length may be conveniently stored on the adaptor 80'.

Figure 20:
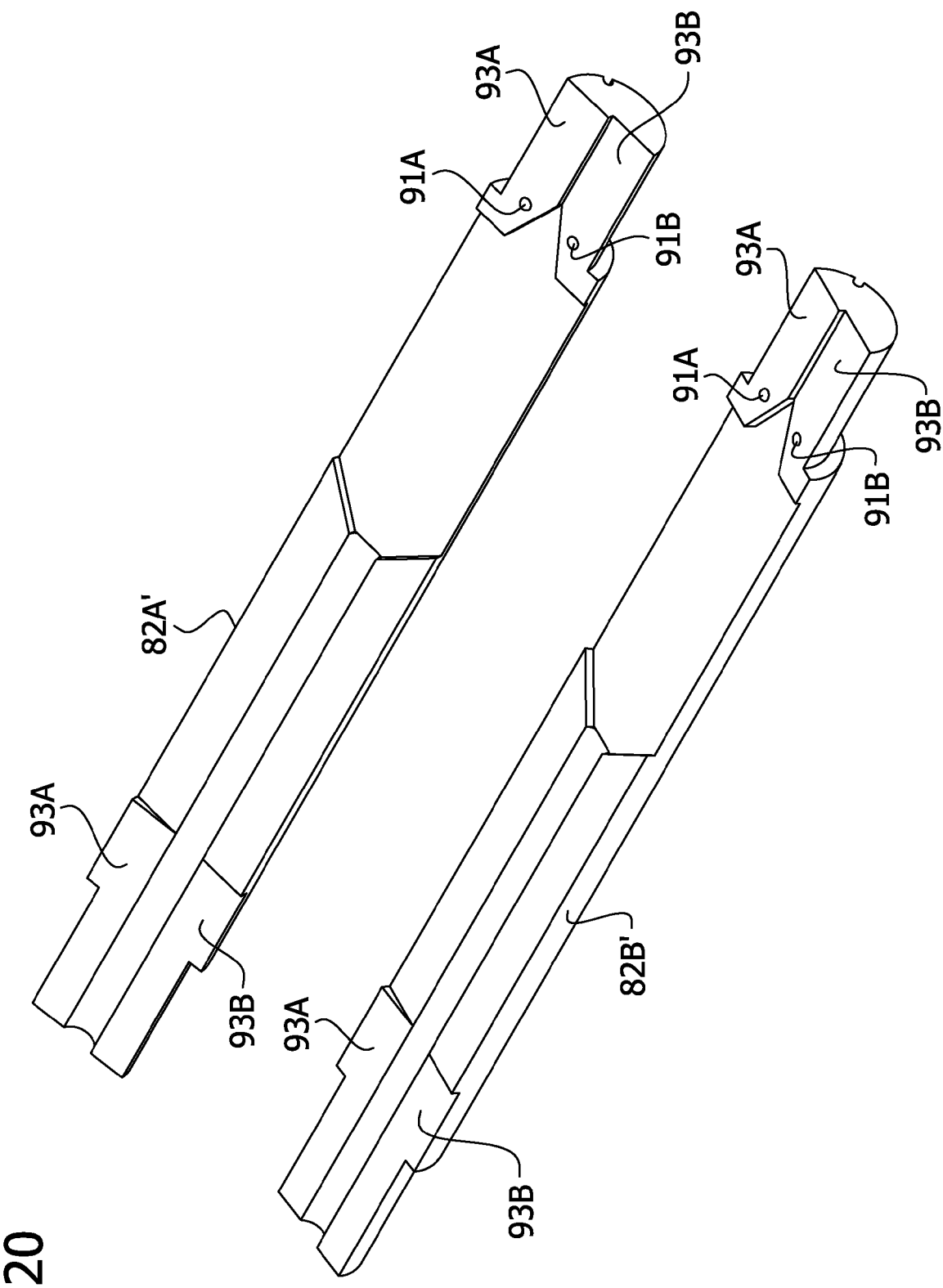
FIG. 20 is a perspective of portions of the body removed from the rotary bit.
Figure 21:
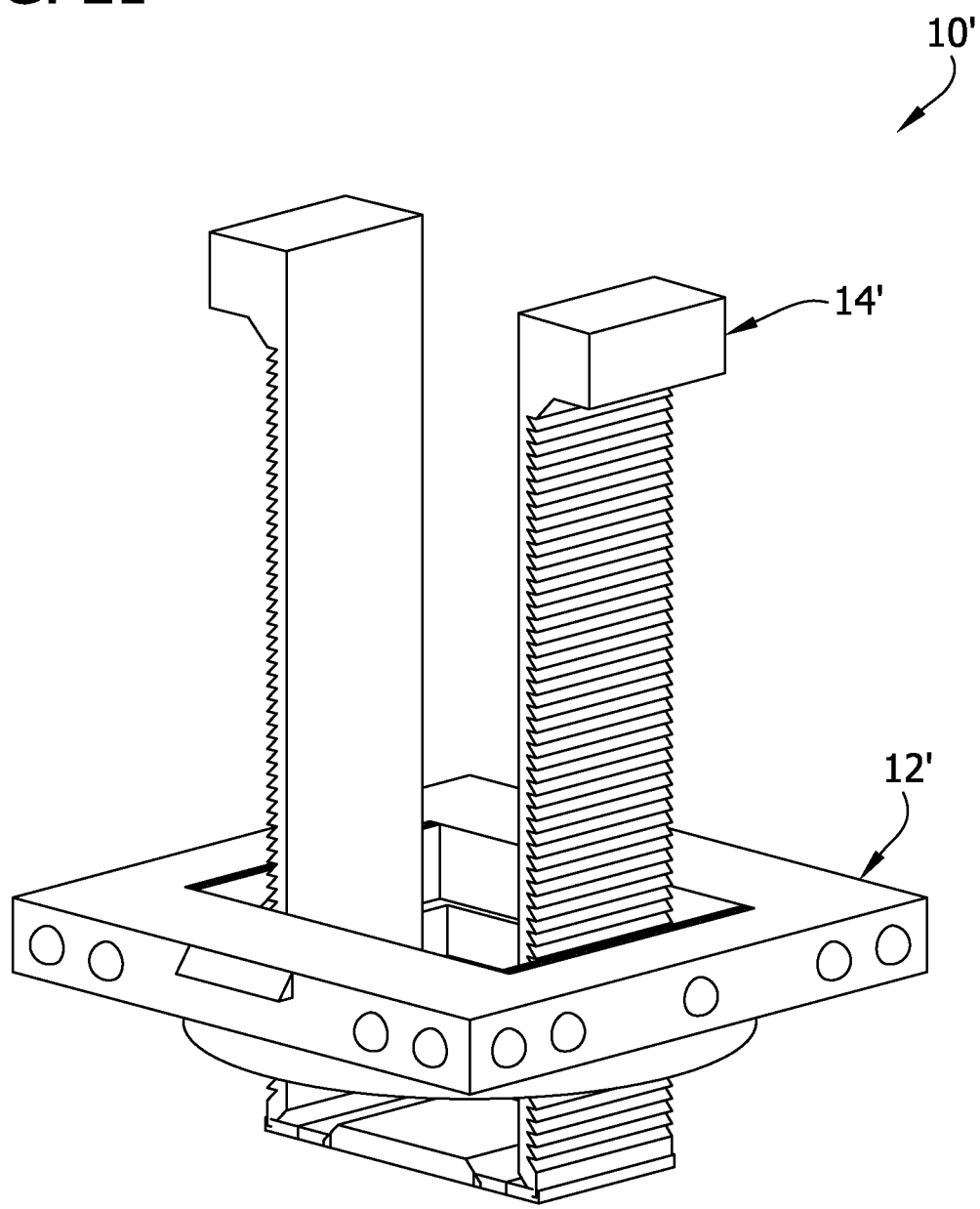
FIG. 21 is a perspective of a second embodiment of a connector of the present invention, the connector including a retainer and a support.

The rotary bit adaptor 80' may include other features which facilitate securing of the body parts 82A', 82B' in position with respect to each other, or facilitate securing the mount 82 on the rotary bit R. For example, as shown in FIG. 20, the body parts 82A', 82B' may include protuberances and corresponding depressions on surfaces of the body parts which engage each other when the body parts are mounted on the rotary bit R. In the illustrated embodiment, the body parts include relatively small bulbous protuberances 91A and corresponding depressions 91B adjacent and on opposite sides of a rotary bit tip receiving portion. The body parts 82A', 82B' also include protuberances and depressions in the form of relatively large outcroppings 93A and recesses 93B which mate when the body parts are mounted on the rotary bit R. Other forms of protuberances and depressions for mating of the body parts may be used without departing from the scope of the present invention.

It will be appreciated that the body parts 82A', 82B' of the mount 82' may be configured to be substantially identical to each other. For example, the body parts 82A', 82B' shown in FIG. 20 are identical to each other and may be formed using the same mold.

It will be understood, that guides 84' having different sizes (e.g., corresponding to existing holes having different diameters) may be used with the adaptor 80', as described above. The guide 84' centers the adaptor 80' and rotary bit R in the existing opening (e.g., see FIG. 17) so the rotary bit enlarges the existing opening on center.

FIGS. 21-26 illustrate a second embodiment of a connector of the present invention indicated generally by the reference number 10'. The connector is identical to the connector 10 except as described hereafter. Corresponding parts are designated with corresponding reference numbers, plus a prime indicator. For example, the connector 10' includes a retainer 12' and a support 14'. The retainer 12' and support 14' are configured for ratcheting engagement as described above with respect to the connector 10.

Figure 22:
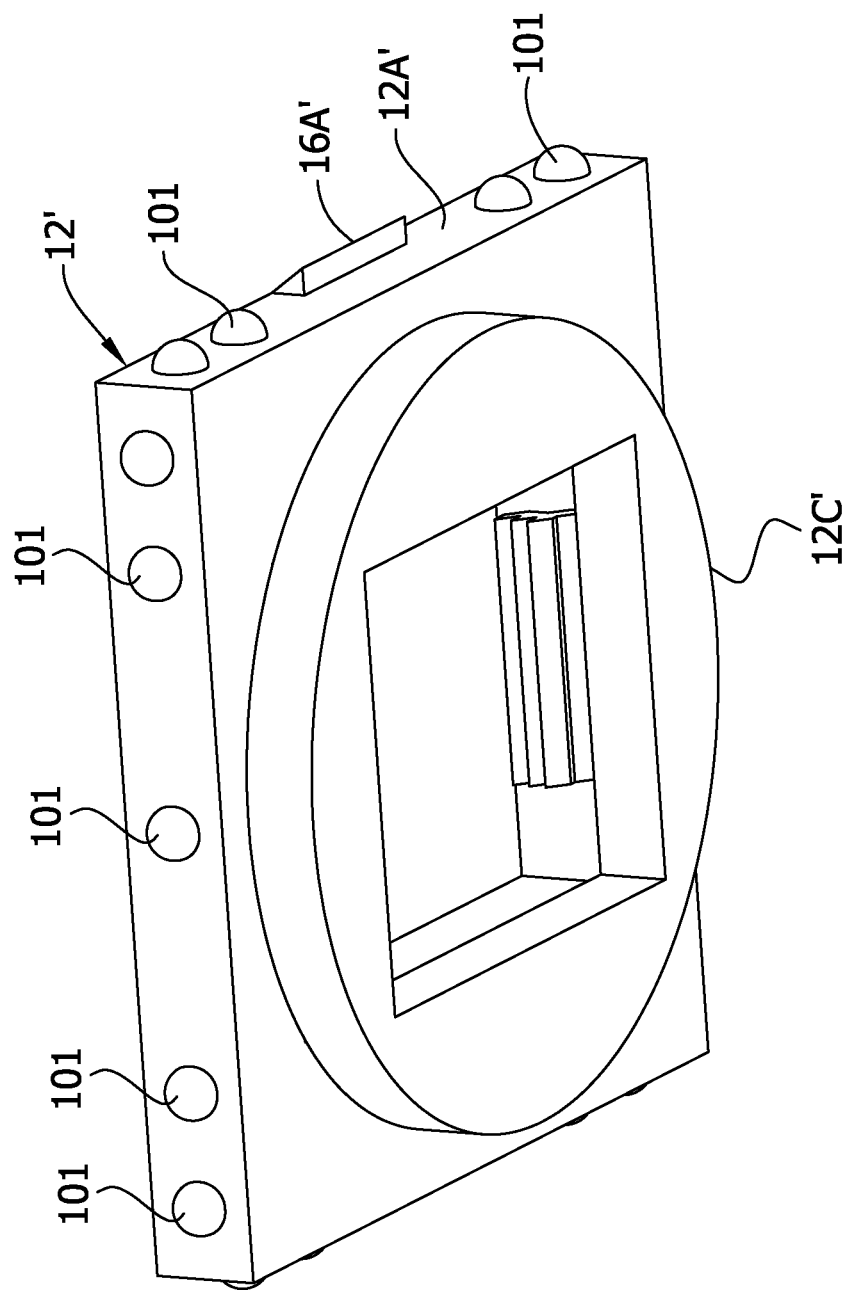
FIG. 22 is a bottom perspective of the retainer.

As shown in FIG. 22, in this embodiment, the retainer 12' includes locating structure 12C' in the form of a cylindrical member instead of separate flanges 12C (see FIG. 5) for extending into the opening in the tread T to locate the retainer 12' with respect to the opening in the tread.

Figure 23:
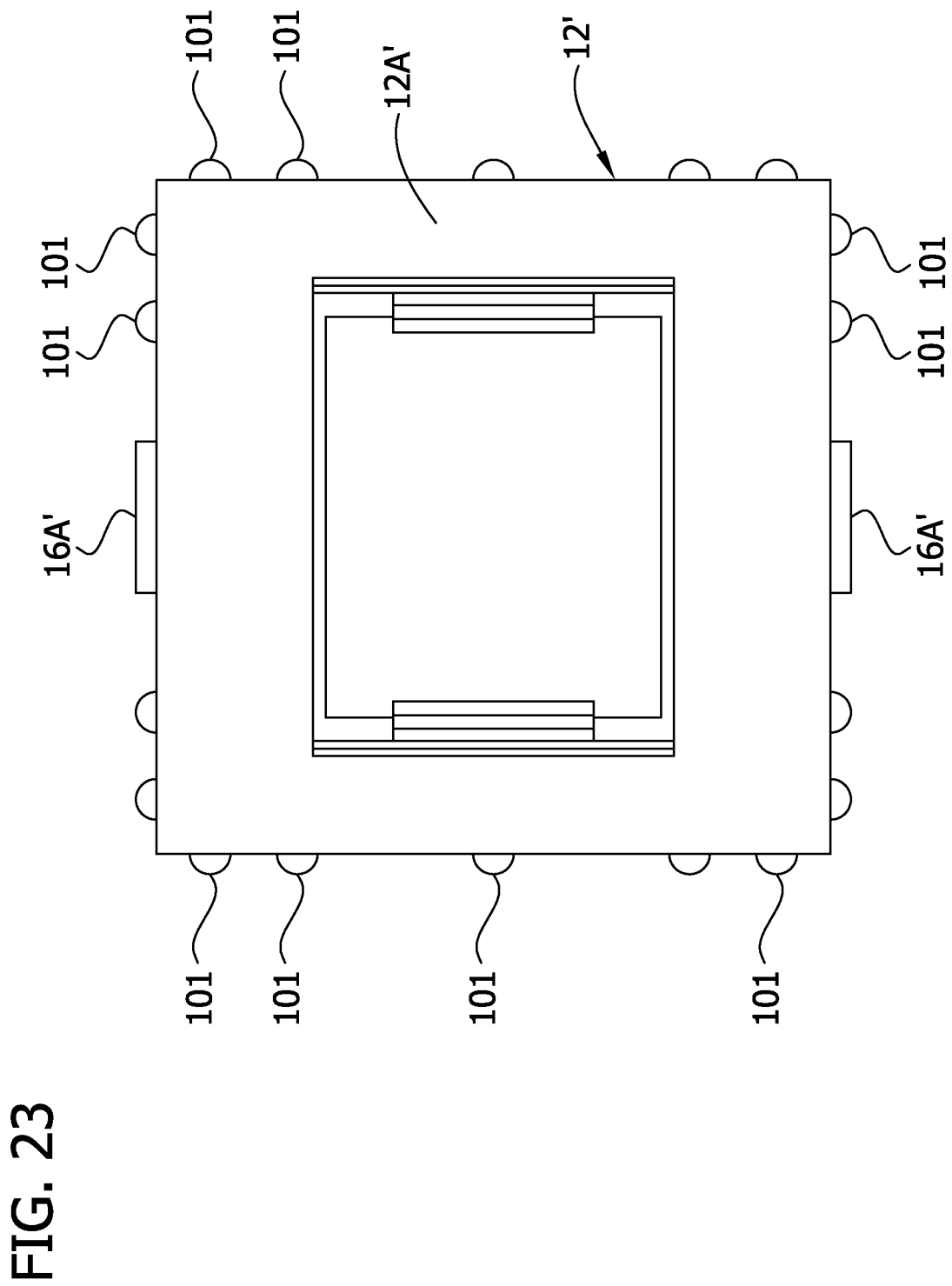
FIG. 23 is a top view of the retainer.

Referring to FIGS. 22 and 23, in this embodiment, the retainer 12' includes different connection structure for securing the cover on the connector 10'. As shown in FIGS. 22 and 23, the connection structure includes rounded protrusions 101 on the frame 12A' of the retainer 12'. Ribs 16A' similar to ribs 16A are also shown, but it will be understood the ribs 16A' may be omitted or replaced with additional protrusions 101. In this embodiment, the ribs 16A' are not used to "lock" the cover on the connector 10'. Rather, the cover 16' is held by friction fit on the connector 10', as described in further detail below.

Figure 24:
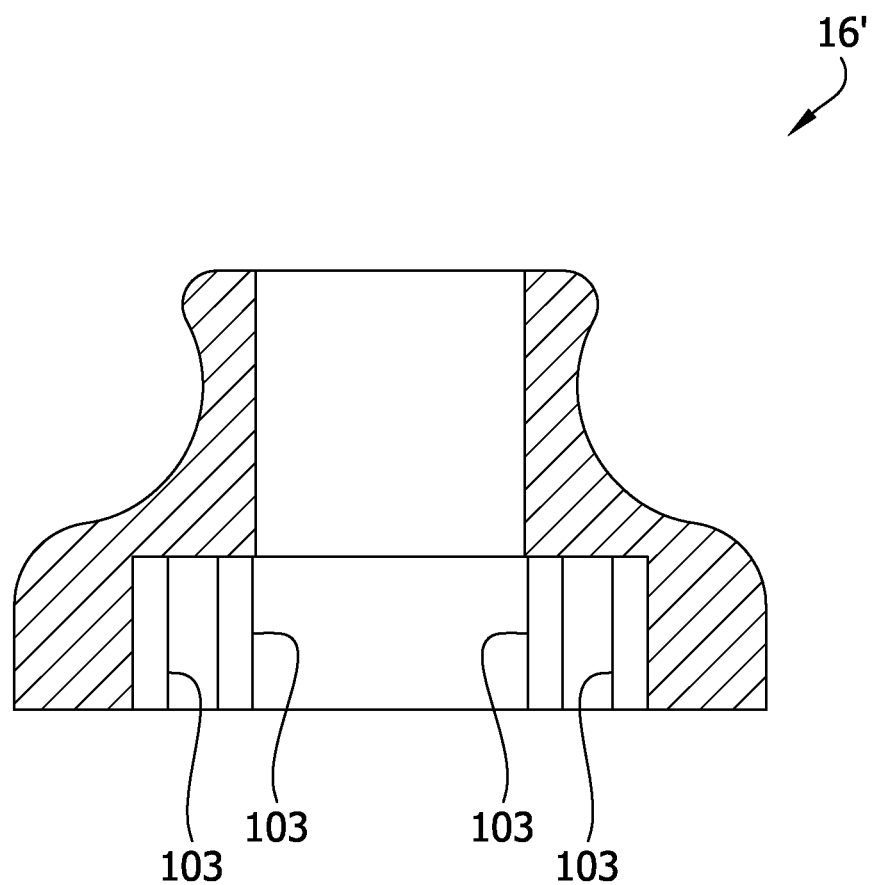
FIG. 24 is a cover for the connector shown in section.
Figure 25:
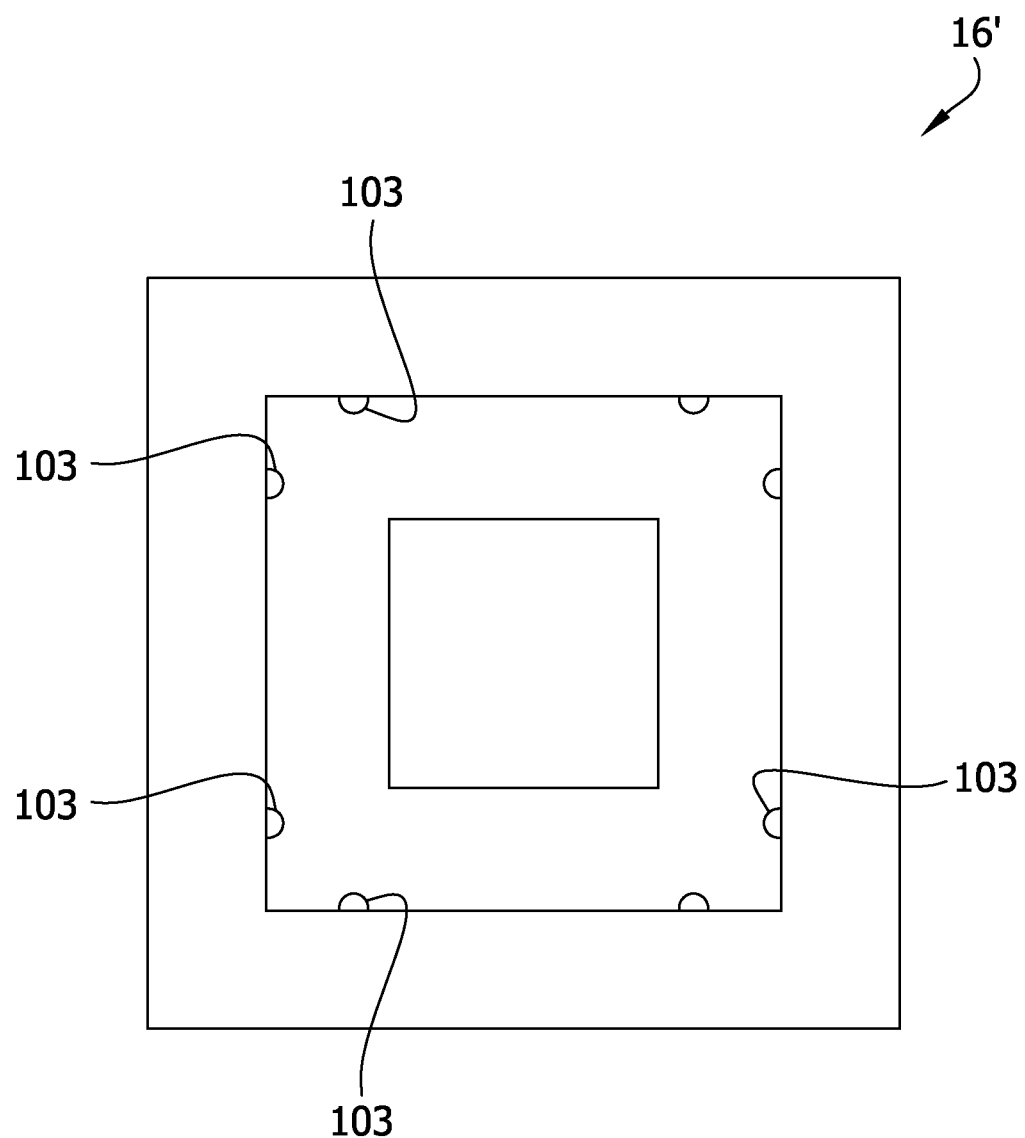
FIG. 25 is a bottom view of the cover.
Figure 26:
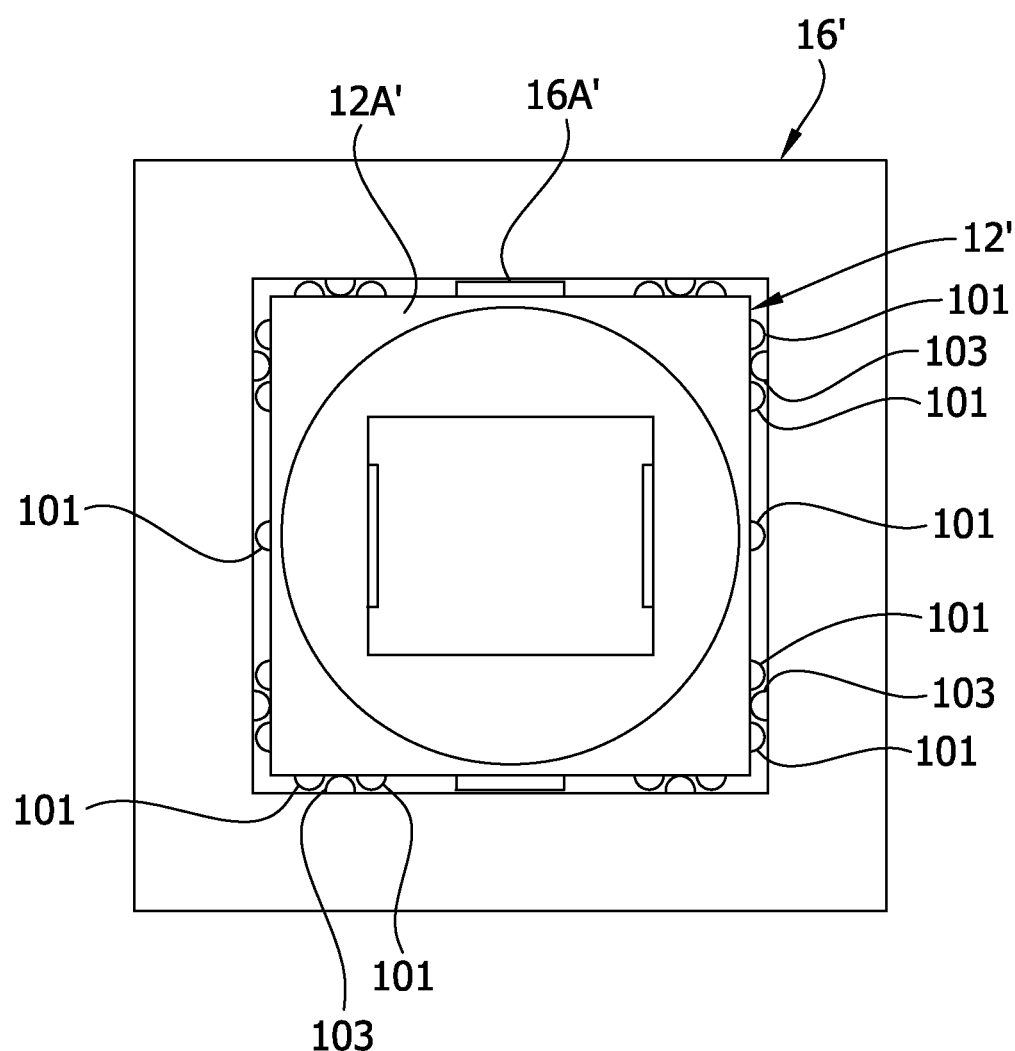
FIG. 26 is a bottom view of the cover on the retainer, ribs of the cover being received between protrusions of the retainer.

FIGS. 24 and 25 illustrate a cover or "shoe" 16' configured for use with the connector 10'. The cover 16' includes internal ribs 103 configured for engaging the frame 12A' of the retainer 12'. As shown in FIG. 26, the ribs 103 are positioned to be received between pairs of the protrusions 101 on the retainer 12'. Desirably the ribs 103 each have a width which causes the ribs to engage the protrusions 101 on the opposite sides of the ribs. Thus, the ribs 103 "locate" the cover 16' with respect to the retainer 12' by the ribs fitting between the protrusions 101. The frictional fit of the ribs 103 against the frame 12A' and the protrusions 101 against the inner surfaces of the cover 16' maintains the cover on the connector 10'. The cover 16' may be selectively removable from the connector 10' by overcoming the frictional engagement of the cover with the connector.

Figure 27:
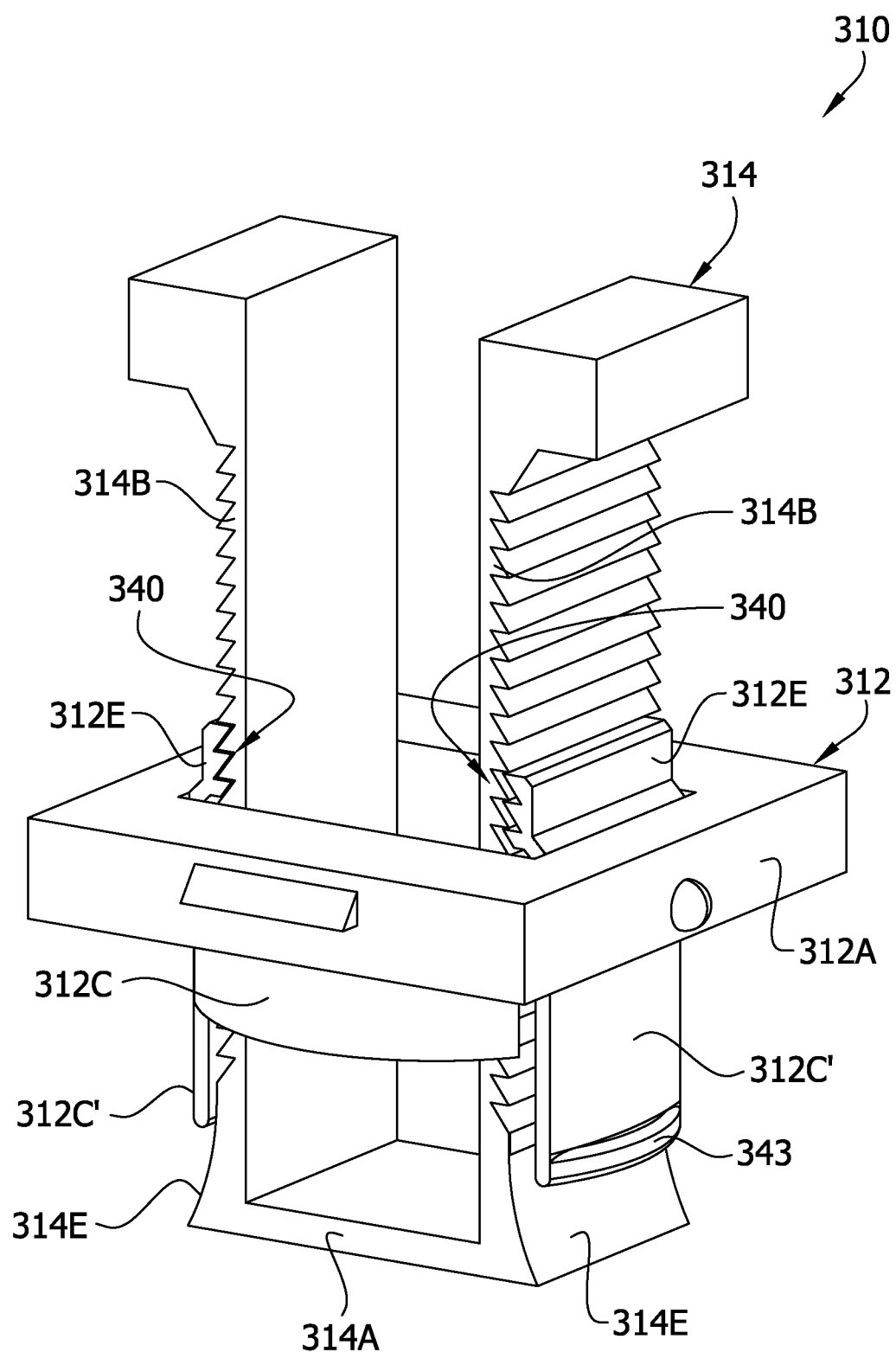
FIG. 27 is a perspective of a third embodiment of a connector of the present invention, the connector including a retainer and a support.
Figure 28:
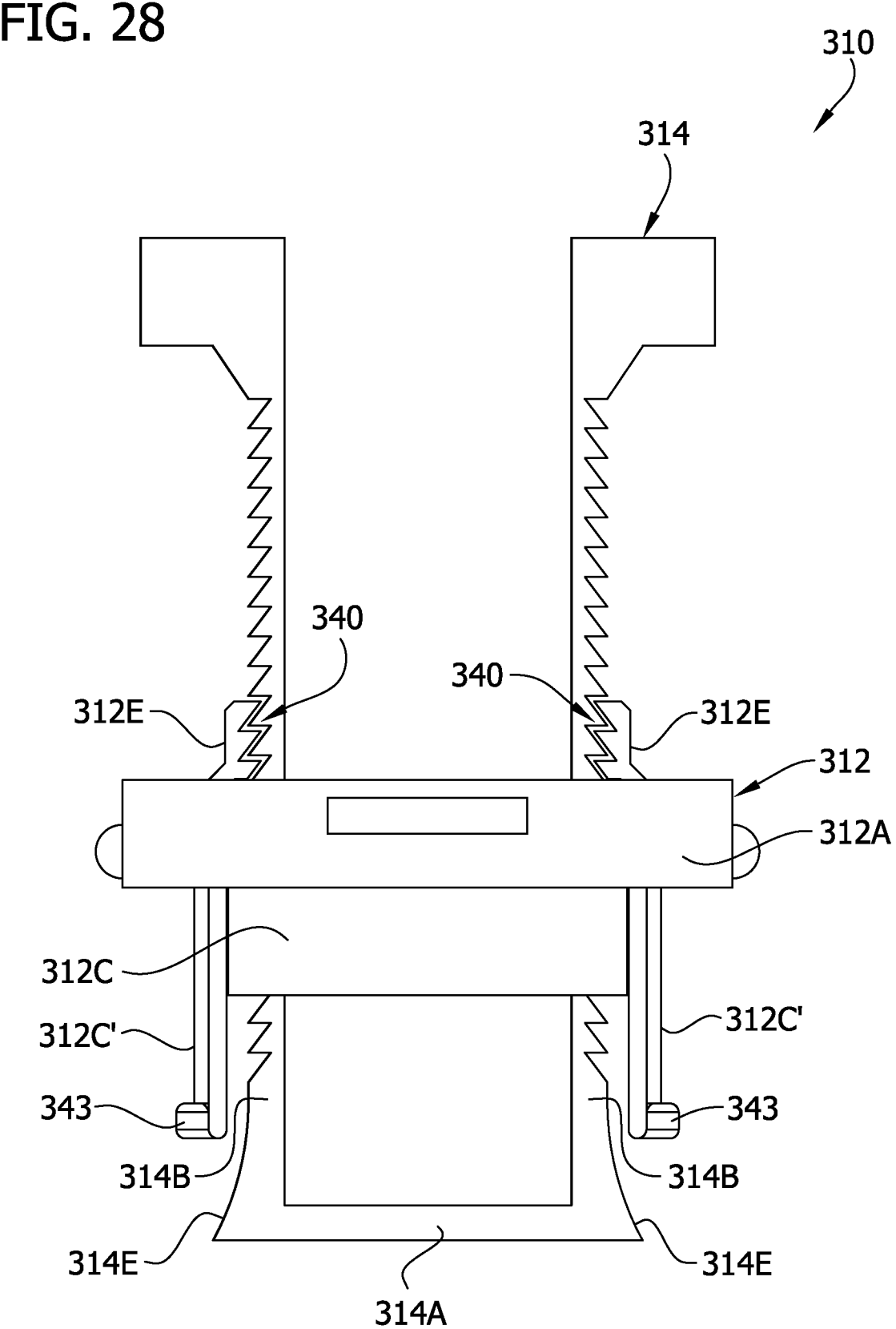
FIG. 28 is an elevation of the connector, the supporting being shown in a starting position with respect to the retainer.
Figure 29:
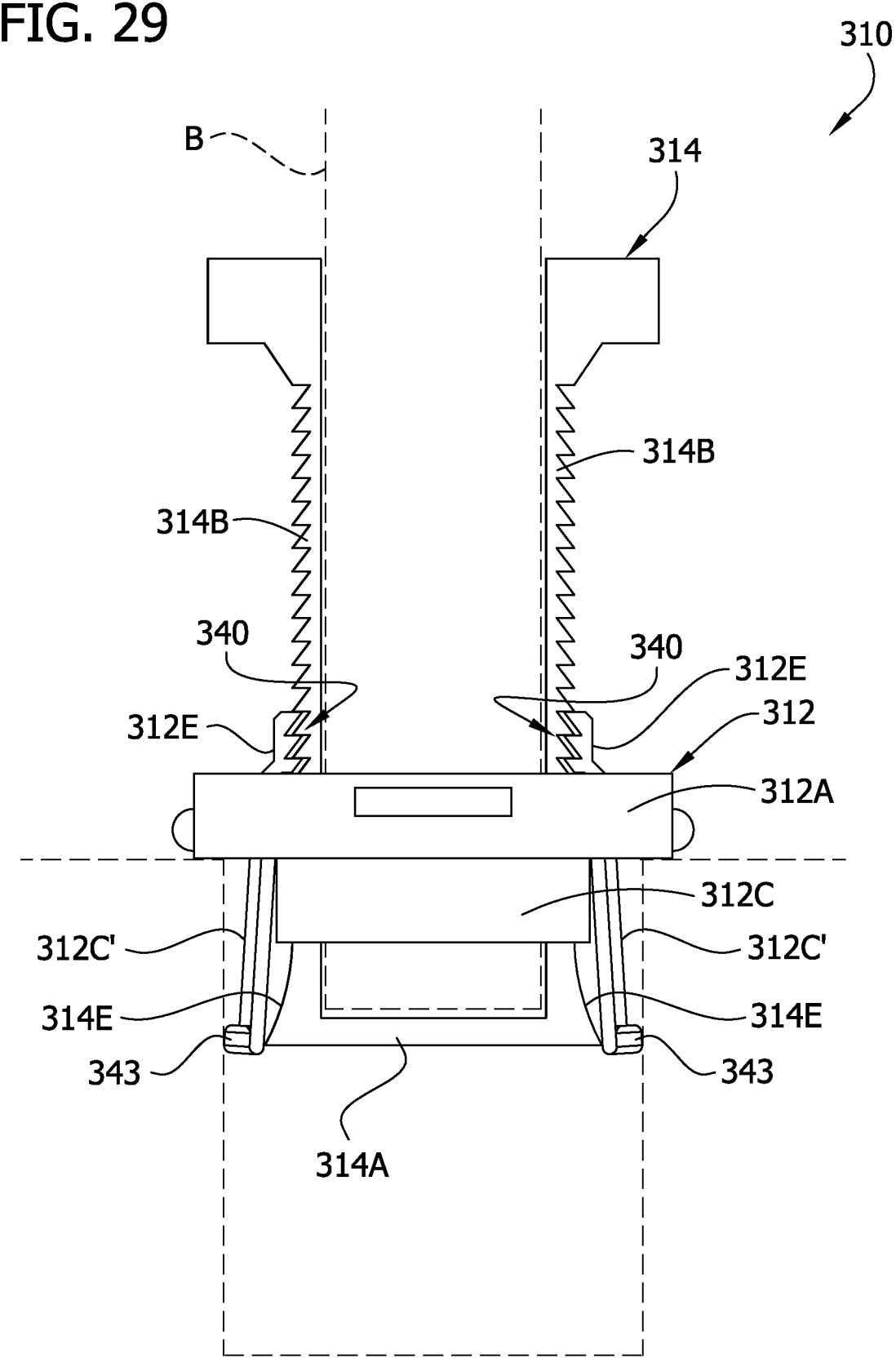
FIG. 29 is an elevation of the connector received in an opening, the support being shown in a raised position relative to the starting position.

Referring to FIGS. 27-29, a third embodiment of a connector of the present invention is indicated generally by the reference number 310. The connector is identical to the connector 10 except as described hereafter. Corresponding parts are designated with corresponding reference numbers, plus 300. For example, the connector 310 includes a retainer 312 and a support 314. The retainer 312 and support 314 are configured for ratcheting engagement as described above with respect to the connector 10. In this embodiment, the arms 312E extend from the frame 312A upward to a position above the frame. This positions the securement surfaces 340 higher with respect to the opening in the frame 312A than the securement surfaces 40 discussed above. This positioning of the securement surfaces 340 permits greater upward range of movement of the support 314 in the opening of the frame 312A. In this embodiment, the insert of the retainer 312 includes flanges 312C and longer flanges 312C' sized for extending deeper into the opening. The support 314 includes camming surfaces 314E adjacent the base 314A on the outer surfaces of the sides 314B for wedging the flanges 312C' of the insert outwardly into engagement with the opening to anchor the connector 310 in the opening. The illustrated camming surfaces 314E each include a ramp or inclined surface which gradually deflects the flanges 312C' outwardly as the support 314 is moved upward. As shown by comparison of FIGS. 28 and 29, when the support 314 is moved upward in ratcheting engagement with the retainer 312, the camming surfaces 314E drive the flanges 312C' into tight engagement with an inner wall of the opening. The illustrated flanges 312C' include curved feet 343 protruding laterally outward for engaging a circular inner wall of the opening. The anchoring action of the connector 310 provides additional stability of the connection of the baluster in the opening.

Figure 30:
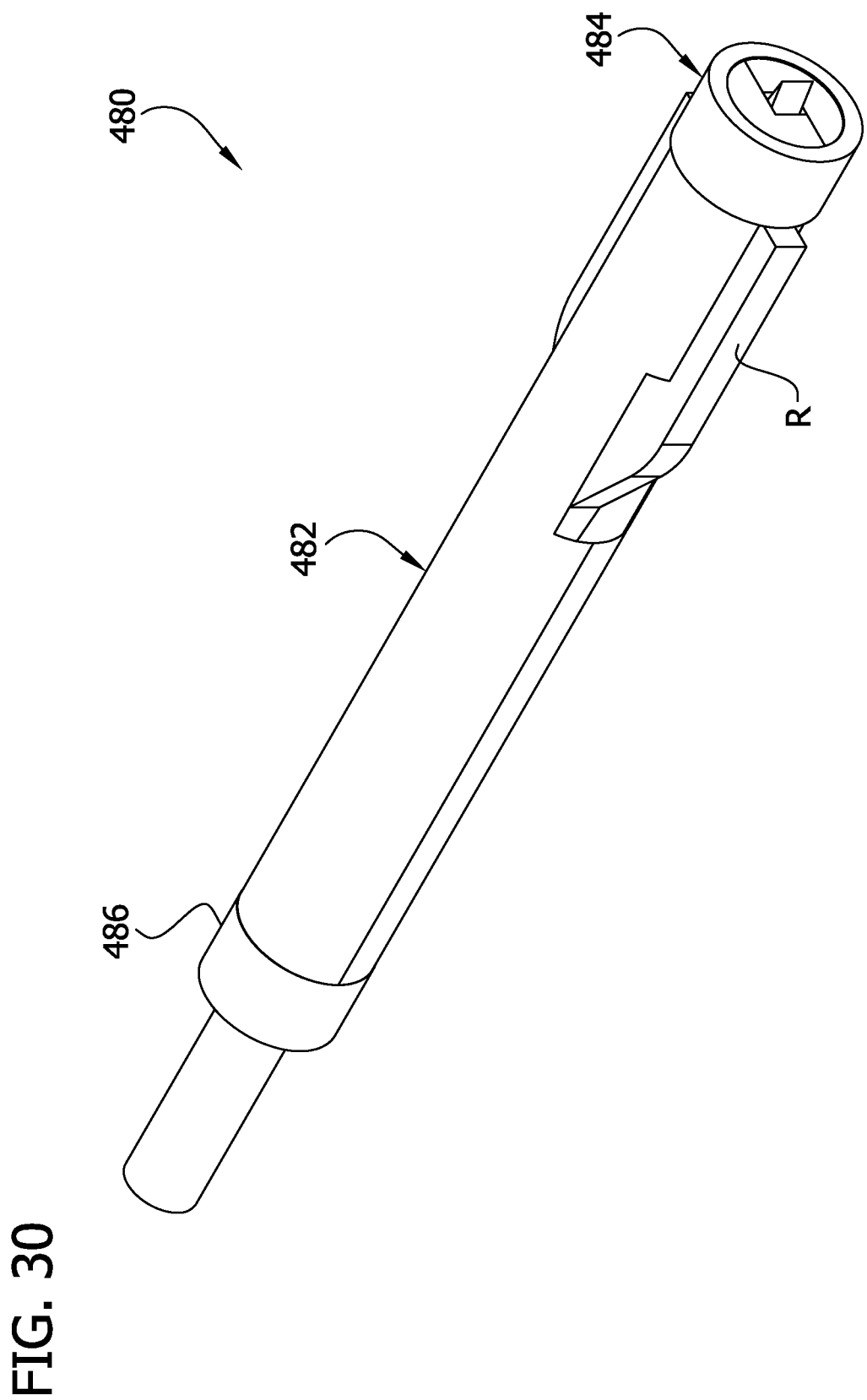
FIG. 30 is a perspective of a third embodiment of a rotary drill bit adaptor on a rotary bit.
Figure 31:
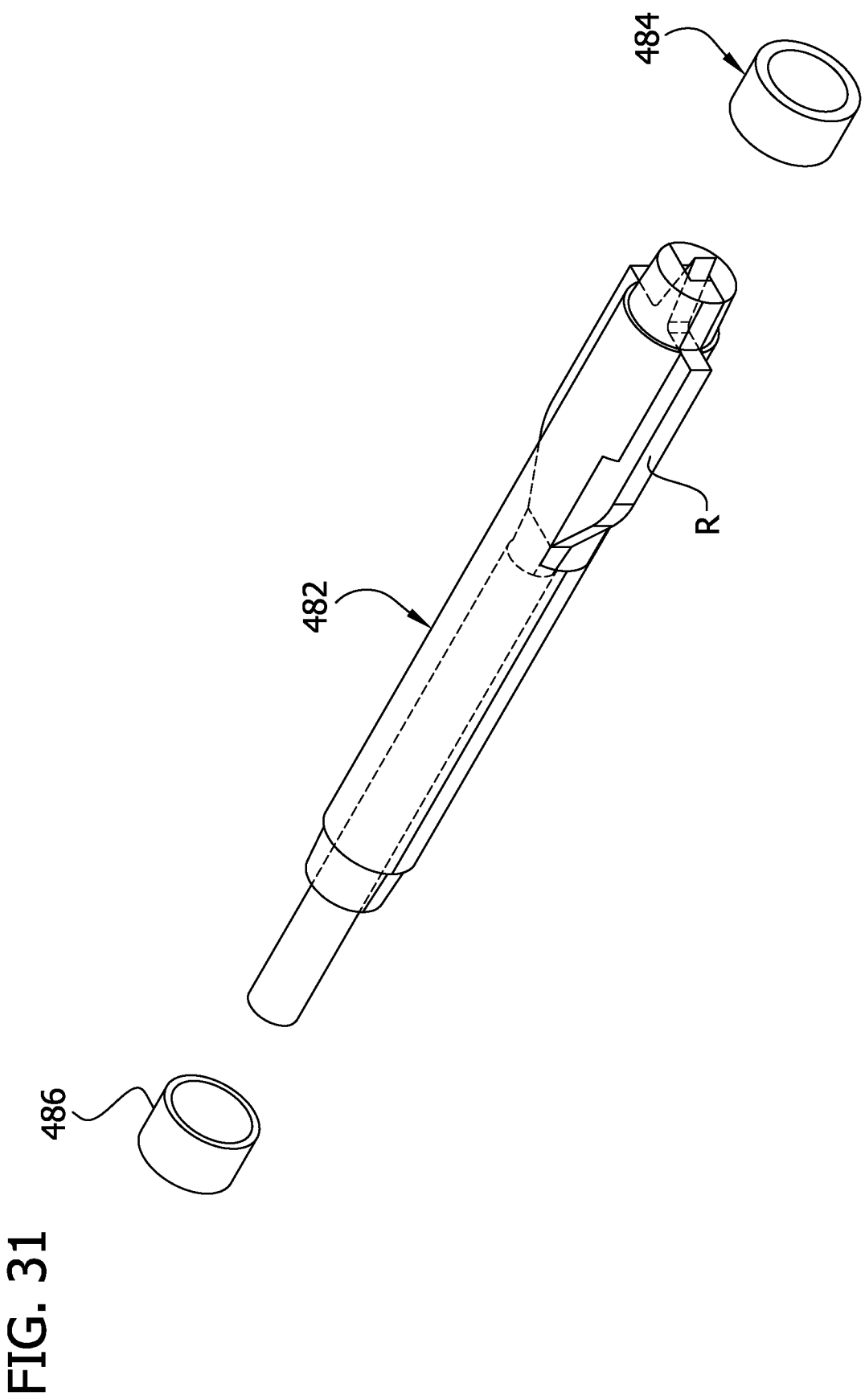
FIG. 31 is a view similar to FIG. 30 but showing a guide and fastener of the adaptor removed from a body of the adaptor.
Figure 32:
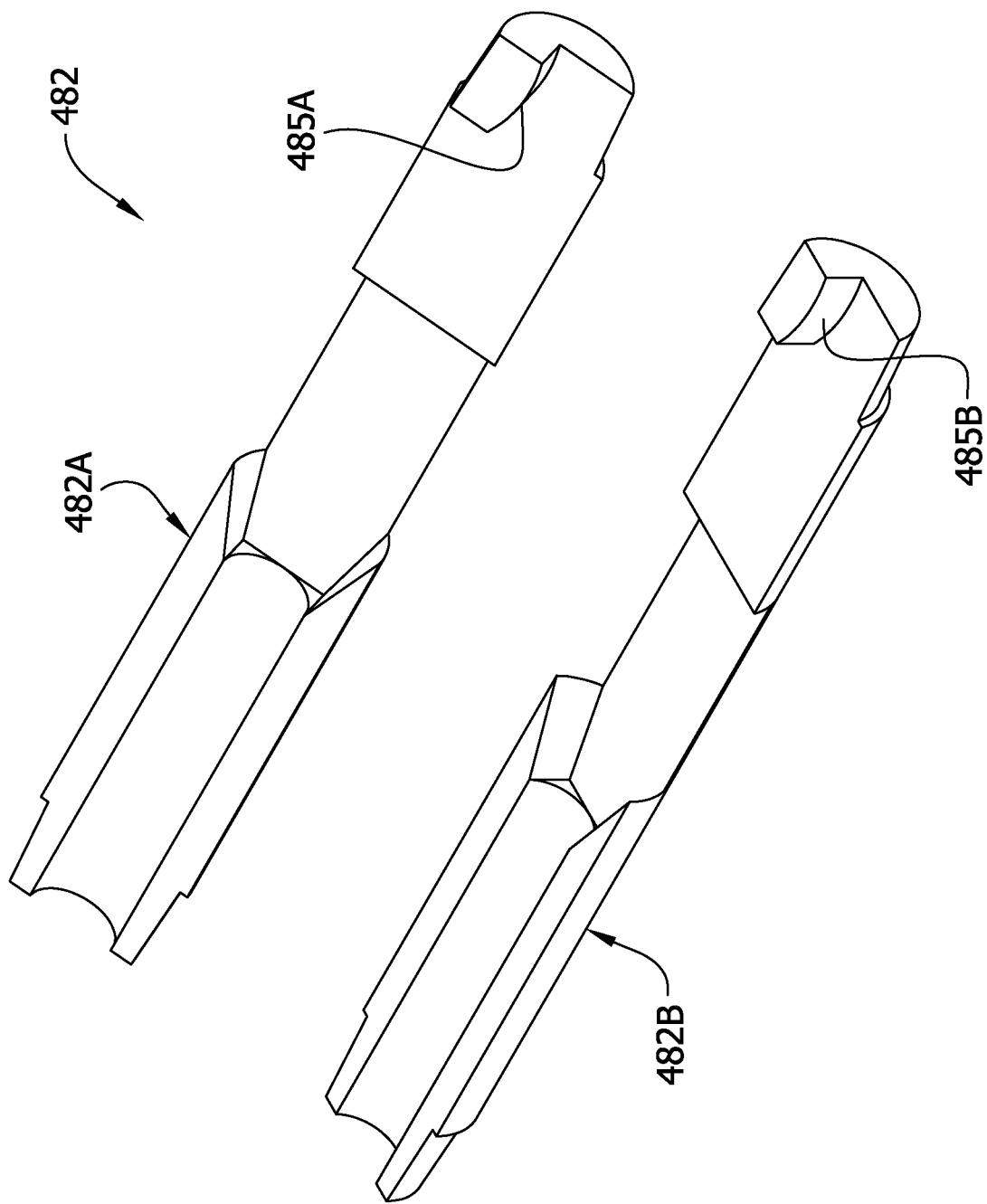
FIG. 32 is a perspective of portions of the body removed from the rotary bit.

Referring to FIGS. 30-32, a third embodiment of a rotary bit adaptor is designated generally by the reference number 480. The bit adaptor 480 is identical to the bit adaptor 80 except as described hereafter and may be used with a rotary bit R as described above. Corresponding parts are designated with corresponding reference numbers, plus 400. For example, the bit adaptor 480 includes a mount 482 and a guide 484. In addition, the mount 482 includes body parts 482A, 482B (FIG. 32). In this embodiment, the bit adaptor 480 includes a fastener in the form of a proximal bushing 486 for securing the proximal ends of the body parts 482A, 482B together. The proximal end of the mount 482 includes a circumferential recess for receiving the bushing 486. The circumferential recess and the bushing 486 have corresponding Morse tapers for securing the bushing 486 on the proximal end of the mount 482. The guide 484 is receivable over a circumferential recess defining a guide receiver on the distal end of the mount 482. The guide 484 and the guide receiver have corresponding Morse tapers for securing the guide on the guide receiver.

As shown in FIG. 32, the body parts 482A, 482B each include a rotary bit tip engagement surface 485A, 485B. The engagement surfaces 485A, 485B include convex curvature for engaging rotary bit tips having different widths. When the body parts 482A, 482B are positioned in clamshell relationship with respect to each other, the engagement surfaces 485A, 485B define opposite sides of an opening sized for receiving the tip of a rotary bit and sized for engaging the tip at an intermediate portion along the length of the tip. The curved engagement surfaces 485A, 485B permit them to engage bit tips having various widths and various degrees of taper. Accordingly, the convex curvature bounding the tip receiving opening provides greater adaptability for centering tips of various sizes and tapers with respect to the guide 484.

Figure 33:
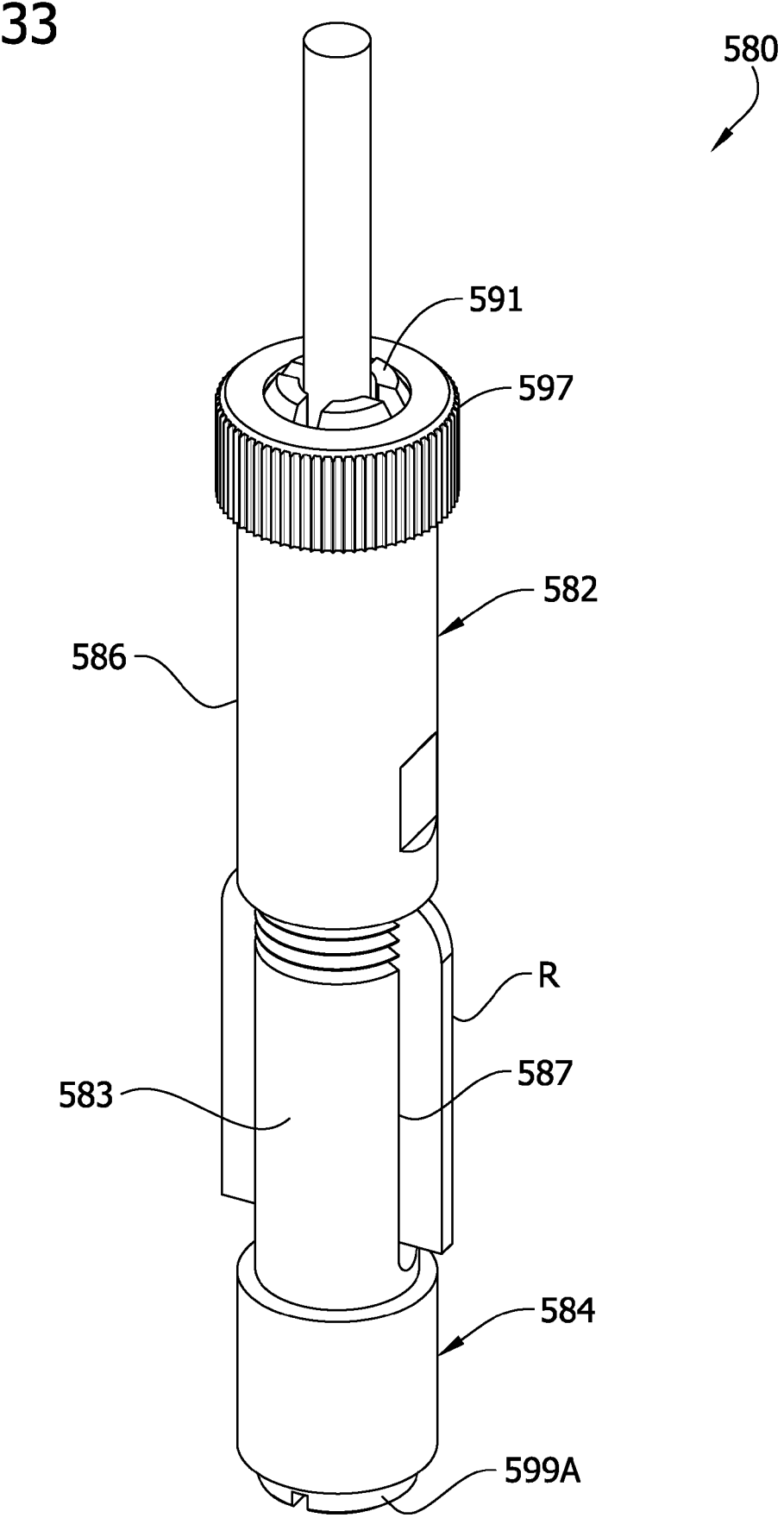
FIG. 33 is a perspective of a fourth embodiment of a rotary drill bit adaptor on a rotary bit.
Figure 34:
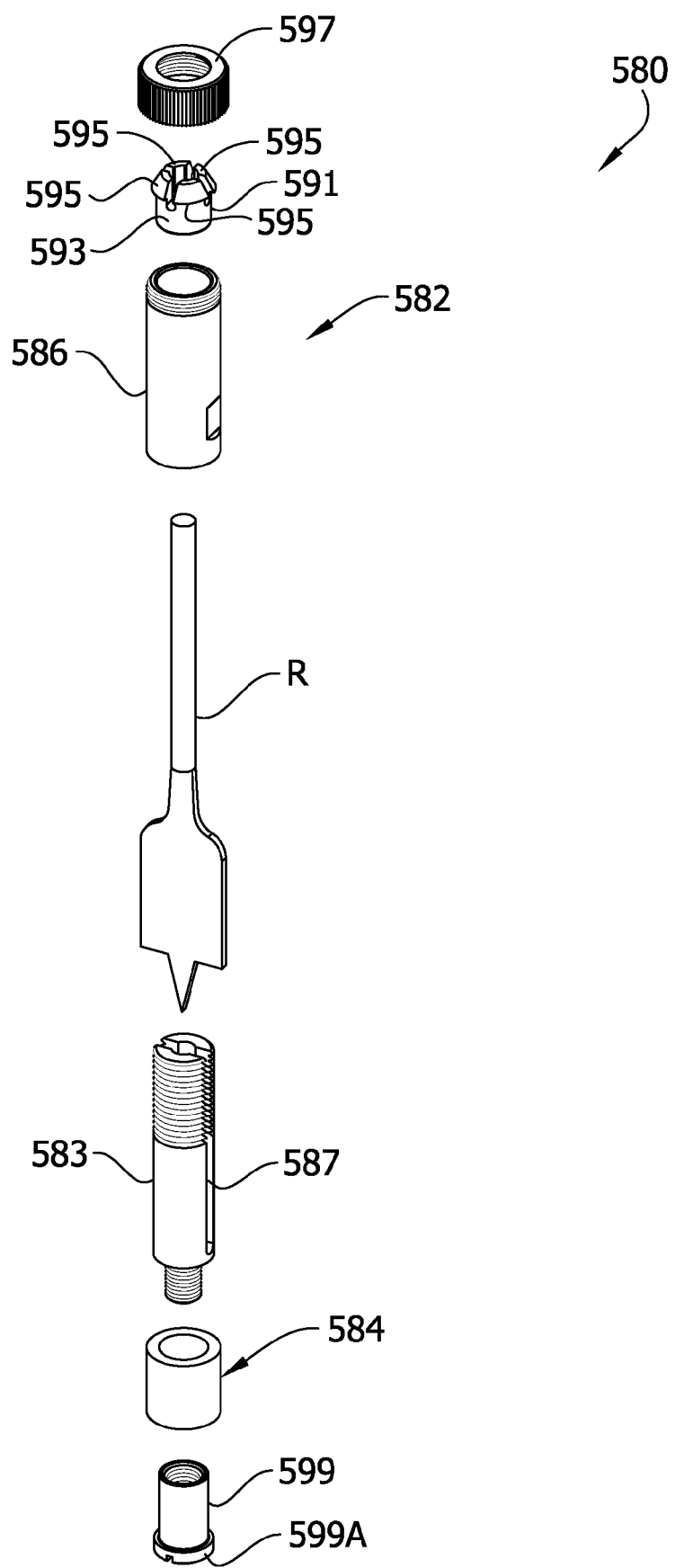
FIG. 34 is a view similar to FIG. 33 but showing the rotary drill bit adaptor exploded and removed from the rotary bit.
Figure 35:
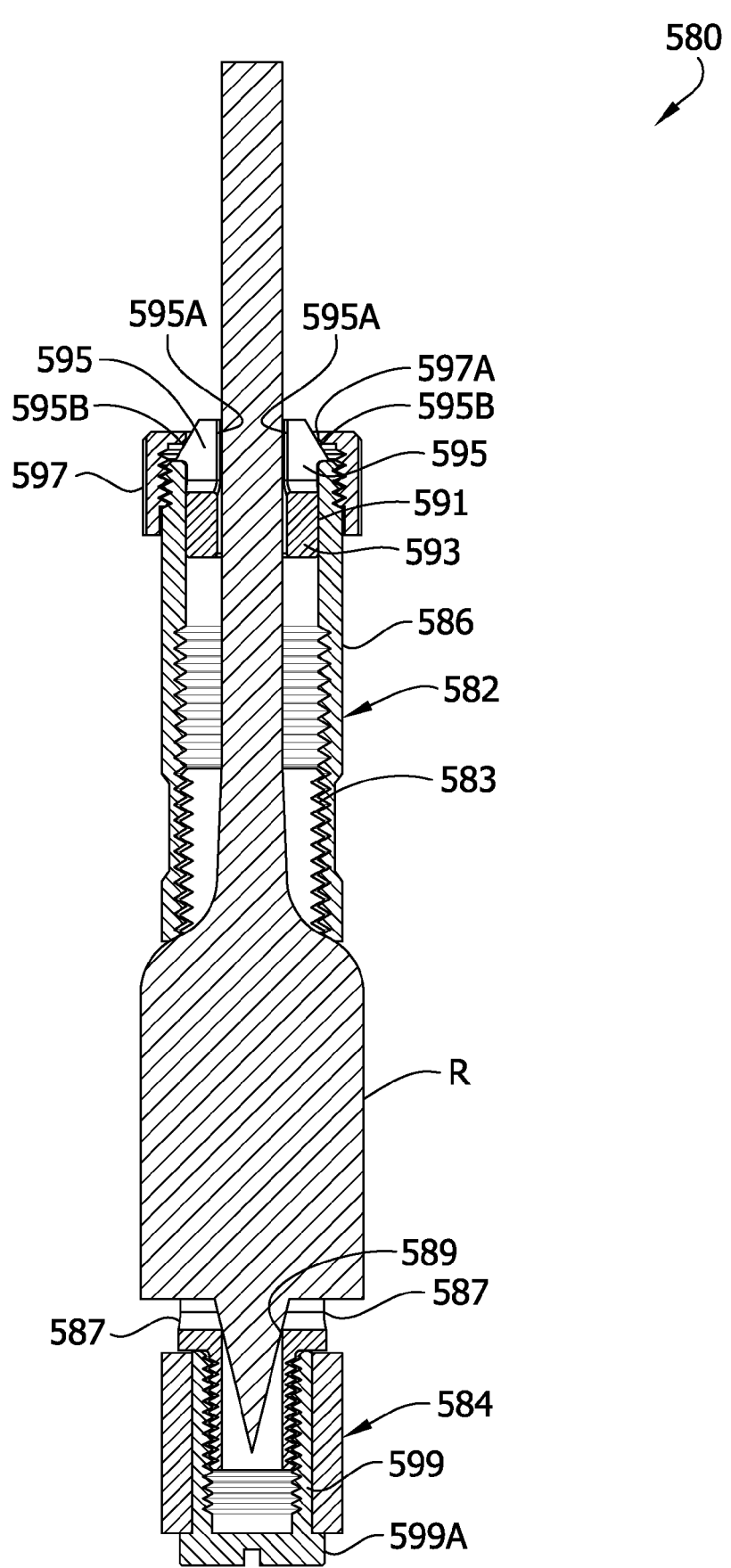
FIG. 35 is a section of the rotary bit adaptor and the rotary bit taken along a plane including the longitudinal axes of the rotary bit adaptor and the rotary bit.

Referring to FIGS. 33-35, a fourth embodiment of a rotary bit adaptor is designated generally by the reference number 580. The bit adaptor 580 is similar to the bit adaptor 80 and may be used with a rotary bit R as described above. Corresponding parts are designated with corresponding reference numbers, plus 500. For example, the bit adaptor 580 includes a mount 582 and a guide 584. The mount 582 is adapted for releasable mounting on the rotary bit R. The guide 584 on the mount 582 is adapted for guiding the tip of the rotary bit R into an existing opening in a position in which the tip of the rotary bit is centered in the opening. The guide 584 is positioned on the mount 582 such that it is centered with respect to the tip of the bit when the mount is mounted on the bit. In this embodiment, the mount 582 includes a body 583 having a tubular shape including a recess sized and shaped for receiving the rotary bit R in the body. The body 583 includes slots 587 extending along the length of the body for permitting the sides of the head of the rotary bit to extend out of the body. The body 583 includes a proximal end threaded for receiving a fastener 586 in threaded engagement for securing the rotary bit in the body 583. The fastener 586 is tubular and includes an internal thread. When the fastener 586 is threaded on the body 583, rotation of the fastener tending to draw it toward the distal end of the body causes the fastener to engage shoulders of the head of the rotary bit. The fastener 586 may include flats so that it may be more securely gripped by a wrench for rotating the fastener. Reverse rotational direction threads may be provided for engagement of the fastener 586 on the body 583 to prevent inadvertent unthreading of the fastener from the body during rotation of the rotary bit R. As shown in FIG. 35, the threaded engagement of the fastener 586 and the body 583 tends to force the tip of the rotary bit partially into an opening 589 adjacent the distal end of the body. The opening 589 is sized for engaging the tip of the rotary bit R at an intermediate portion along its length for centering the tip with respect to the mount 582 and thus with respect to the guide 584. The opening 589 is sized to engage rotary bit tips having various widths and tapers. Desirably, the opening 589 is sized smaller than the maximum width of the tapered tip such that the tip positively centers the distal end of the bit R in the body 583. The blades of the bit do not bottom out or limit movement in a distal direction in the slots 587 of the body 583 to not prevent the tip from centering the distal end of the bit in the mount.

Referring to FIG. 35, the mount 582 includes a collet 591 at a proximal end of the mount for engaging the shaft of the rotary bit R. The collet 591 has a longitudinal axis in alignment with the longitudinal axis of the guide 584. The collet 591 includes an annular portion 593 and a plurality of arms 595 extending axially with respect to the annular portion. The arms 595 each include an inward facing shaft engagement surface 595A positioned for engaging the shaft. In the illustrated embodiment, the collet 591 is received in a proximal end of the mount body 583 and is retained in position with respect to the mount body by a collet actuator 597 in threaded engagement with the proximal end of the fastener 586. An opening in the collet actuator defines an annular collet engagement surface 597A positioned for engagement with camming surfaces 595B on the collet arms 595. Rotation of the collet actuator 597 tending to move it in a distal direction with respect to the fastener 586 causes the annular collet engagement surface 597A to move along the camming surfaces 595B on the collet arms 595. This causes the collet arms 595 to deflect inward to reduce the inner diameter of the collet 591 for bringing the shaft engagement surfaces 595A into engagement with the shaft. Engagement of the collet 591 with the shaft centers the shaft with respect to the mount 582 and thus the guide 584 and brings the longitudinal axis of the rotary bit R (along which the shaft and tip extend) into alignment with the longitudinal axis of the guide. Accordingly, the mount 582 is configured for positioning the longitudinal axis of the guide 584 in alignment with the longitudinal axis of the rotary bit R when the mount is mounted on the rotary bit.

The guide 584 is received on a threaded distal end of the mount body 583 defining a guide receiver. The guide is secured on the guide receiver by a retainer 599 in the form of a nut having a threaded bore for reception over the threaded distal end of the body 583. The retainer 599 includes a distal flange 599A for retaining the guide 584 in position on the mount 582. The guide 584 is selectively removable from the mount 582 by unthreading the retainer 599. Guides having various sizes (e.g., different outer diameters and/or lengths) may be interchangeably mounted on the mount 582. The blades of the bit R extend outboard of the guide 584 (i.e., the bit head has a width between its opposite sides greater than the width of the guide) to expose the outer ends of the blades so they increase the size of the opening when the bit is rotated. The guide 584 desirably engages the inside of the opening ahead of the cutting blades of the rotary bit and, depending on the configuration of the guide, may require the user to orient the longitudinal axis of the bit generally in register with the longitudinal axis of the opening to permit the guide and then the cutting blades of the bit to be advanced into the opening. Accordingly, not only is the opening enlarged on center, but the opening is enlarged generally consistently along its original longitudinal axis.

Figure 36:
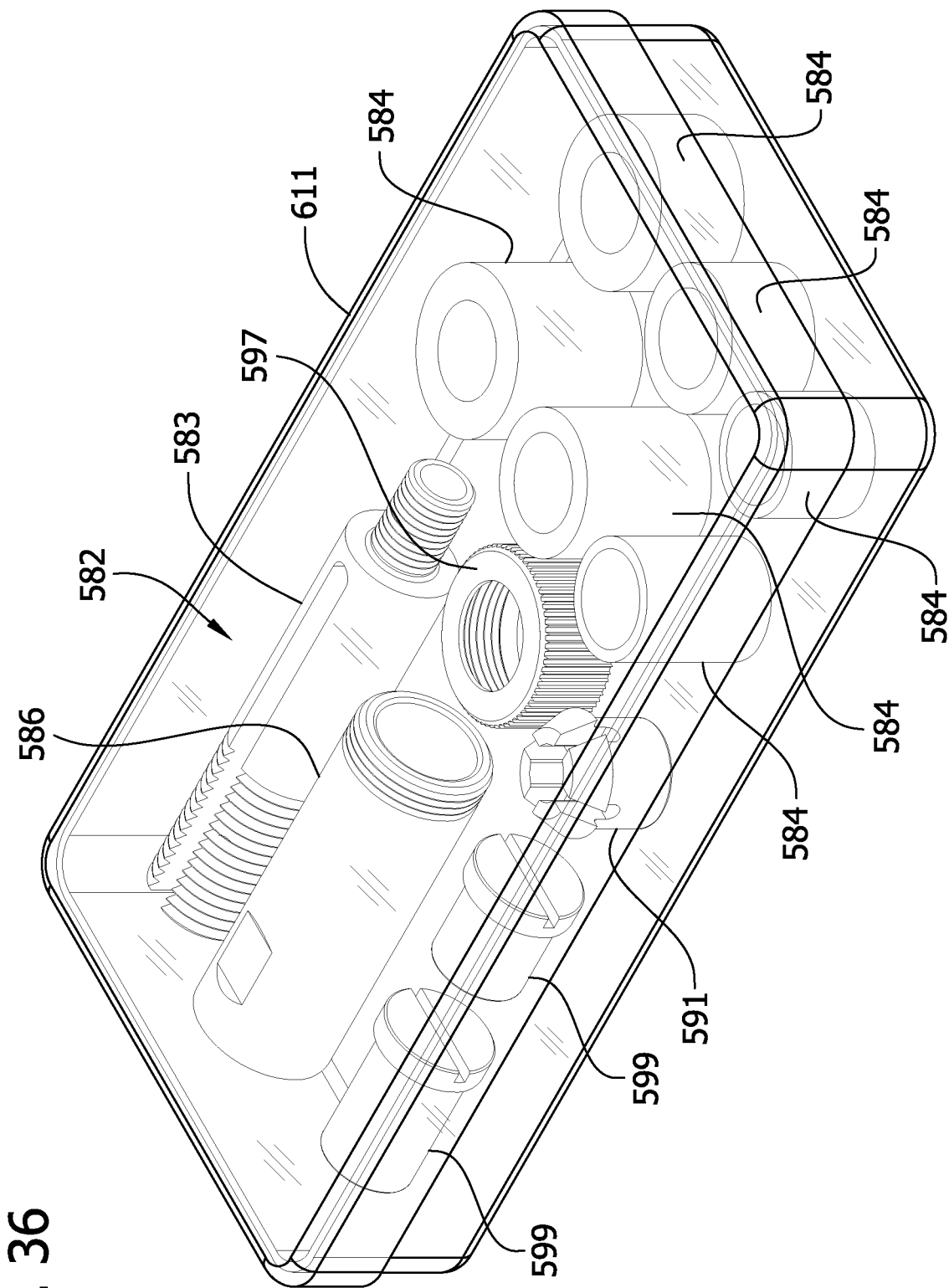
FIG. 36 is a perspective of a packaged rotary bit adaptor kit including a plurality of guides and a plurality of guide retainers.

As shown in FIG. 36 a rotary bit adaptor kit may include the mount 582 (e.g., including a body 583, fastener 586, collet 591, and collet actuator 597), a plurality of guides 584, and optionally a plurality of guide fasteners 599. The illustrated guides 584 comprise tubular bearings or bushings. For example, the bearings may be formed of oil impregnated bronze or brass. The plurality of guides 584 are selectively mountable on the mount 582 for guiding the tip of the rotary bit R into existing openings having different sizes in a position in which the tip of the rotary bit is centered in the openings. For example, the plurality of guides 584 may include guides having outside diameters corresponding to existing opening diameters of 5/8, 11/16, 3/4, 13/16, and/or 7/8 inch. The guides 584 may have corresponding outside diameters which are slightly less than (about the same as) these nominal diameters so the guides do not bind in the openings. In the illustrated kit, a first set of the guides 584 has a first length (e.g., 1/2 inch), and a second set of the guides has a second length (e.g., 3/4 inch). It may be desirable to use a guide 584 having a relatively short length in a shorter opening (e.g., an opening not forming a hole). On the other hand, when the length of the opening is not a limiting factor, it may be desirable to use a longer guide 584 to more accurately align the longitudinal axis of the rotary bit in the existing hole. Moreover, if it is desired to enlarge an opening extending at an angle into a substrate (e.g., in the bottom side of an inclined hand rail) a longer guide 584 may be necessary to engage all sides of the opening to align the guide and thus the rotary bit with the existing opening. Guide retainers 599 having lengths corresponding to the various lengths of the guides may also be provided. The kit may include packaging 611 in which the various components may be arranged for sale and/or storage.

In use, a guide 584 is selected having a size corresponding to the size of an existing opening desired to be enlarged, the guide is mounted on the mount 582, the mount is mounted on the rotary bit R, the rotary bit is guided into the existing opening using the guide, and the rotary bit is rotated in the opening to enlarge it.

As is now apparent, an installation system of the present invention may include a support system (e.g., connector) and tools used for installing the support system. Methods of the present invention may include methods of installing the object (e.g., a baluster) and support system and/or using the various tools associated with the support system. It will be appreciated that the apparatus and methods described herein have broader applicability than stairway construction and may be used in other contexts without departing from the scope of the present invention.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A spade bit adaptor for centering a spade bit in an existing opening to be enlarged by the spade bit, the spade bit including a shaft and a head, the shaft having a proximal end and having a distal end connected to the head, the head having a tip and cutting blades extending laterally with respect to the tip, the spade bit having a longitudinal axis along which the shaft and tip extend, the spade bit adaptor comprising:
   a mount adapted for releasable mounting on the spade bit, the mount being configured to engage the shaft of the spade bit when the mount is mounted on the spade bit, the mount including a proximal portion and a distal portion positioned distally from the proximal portion, the mount including a spade bit shaft receiving opening in the proximal portion sized and positioned for permitting the shaft to extend out of said opening away from the distal portion when the mount is mounted on the spade bit for exposing the proximal end of the shaft outside the mount; and
   a guide on the distal portion of the mount, the guide being adapted for guiding the tip of the spade bit into the existing opening in a position in which the tip of the spade bit is centered in the opening;
   wherein the mount is configured to align the longitudinal axis of the spade bit with the guide by engagement of the mount with the shaft and the tip of the spade bit when the mount is mounted on the spade bit;
   wherein the mount includes a collet having spade bit engaging surfaces adapted for engaging the shaft of the spade bit, the spade bit engaging surfaces being selectively positionable with respect to each other for engaging the spade bit engaging surfaces with the shaft to orient the shaft with respect to the guide.

2. A spade bit adaptor as set forth in claim 1 wherein the mount includes a guide receiver, and the guide is selectively mountable on and removable from the guide receiver.

3. A spade bit adaptor as set forth in claim 1 wherein the mount includes a body configured for receiving the head of the spade bit and permitting the cutting blades of the spade bit to protrude outwardly from the body outboard of the guide.

4. A spade bit adaptor as set forth in claim 1 wherein the mount includes a spade bit tip receiving opening sized and positioned for matingly receiving a portion of the spade bit tip less than the entire tip and engaging opposite sides of the tip along an intermediate portion of a length of the tip spaced distally from the cutting blades for centering the tip with respect to the guide.

5. A spade bit adaptor for centering a spade bit in an existing opening to be enlarged by the spade bit, the spade bit including a shaft and a head, the shaft having a proximal end and having a distal end connected to the head, the head having a tip and cutting blades extending laterally with respect to the tip, the spade bit having a longitudinal axis along which the shaft and tip extend, the spade bit adaptor comprising:
 a mount adapted for releasable mounting on the spade bit, the mount being configured to engage the shaft of the spade bit when the mount is mounted on the spade bit, the mount including a proximal portion and a distal portion positioned distally from the proximal portion, the mount including a spade bit shaft receiving opening in the proximal portion sized and positioned for permitting the shaft to extend out of said opening away from the distal portion when the mount is mounted on the spade bit for exposing the proximal end of the shaft outside the mount; and
 a guide on the distal portion of the mount, the guide being adapted for guiding the tip of the spade bit into the existing opening in a position in which the tip of the spade bit is centered in the opening;
 wherein the mount is configured to align the longitudinal axis of the spade bit with the guide by engagement of the mount with the shaft and the tip of the spade bit when the mount is mounted on the spade bit;
 wherein the mount includes a spade bit tip receiving opening sized and positioned for matingly receiving a portion of the spade bit tip less than the entire tip and engaging opposite sides of the tip along an intermediate portion of a length of the tip spaced distally from the cutting blades for centering the tip with respect to the guide;
 wherein the mount includes a spade bit head engagement member selectively movable for engaging a proximal side of the head to urge the tip distally in the spade bit tip receiving opening for centering the spade bit tip with respect to the guide.

6. A spade bit adaptor as set forth in claim 1 in combination with the spade bit.

7. A kit for centering a spade bit in an existing opening to be enlarged by the spade bit, the spade bit including a shaft and a head, the shaft having a proximal end and having a distal end connected to the head, the head having a tip and cutting blades extending laterally with respect to the tip, the spade bit having a longitudinal axis along which the shaft and tip extend, the kit comprising:
 a mount adapted for releasable mounting on the spade bit, the mount being configured to engage the shaft of the spade bit when the mount is mounted on the spade bit, the mount including a proximal portion and a distal portion positioned distally from the proximal portion, the mount including a spade bit shaft receiving opening in the proximal portion sized and positioned for permitting the shaft to extend out of the opening away from the distal portion when the mount is mounted on the spade bit for exposing the proximal end of the shaft outside the mount; and
 a plurality of guides selectively mountable on the distal portion of the mount for guiding the tip of the spade bit into the existing opening in a position in which the tip of the spade bit is centered in the opening, the plurality of guides including guides having different sizes for selective mounting on the mount for guiding the spade bit into existing openings of different sizes.

8. A spade bit adaptor as set forth in claim 3 wherein the body includes a recess extending distally from the spade bit shaft receiving opening configured for receiving the spade bit from the spade bit shaft receiving opening, the recess including slots opening out opposite sides of the body for permitting the head of the spade bit to extend out of the body.

9. A spade bit adaptor for centering a spade bit in an existing opening to be enlarged by the spade bit, the spade bit including a shaft and a head, the shaft having a proximal end and having a distal end connected to the head, the head having a tip and cutting blades extending laterally with respect to the tip, the spade bit having a longitudinal axis along which the shaft and tip extend, the spade bit adaptor comprising:
 a mount adapted for releasable mounting on the spade bit, the mount being configured to engage the shaft of the spade bit when the mount is mounted on the spade bit, the mount including a proximal portion and a distal portion positioned distally from the proximal portion, the mount including a spade bit shaft receiving opening in the proximal portion sized and positioned for permitting the shaft to extend out of said opening away from the distal portion when the mount is mounted on the spade bit for exposing the proximal end of the shaft outside the mount; and
 a guide on the distal portion of the mount, the guide being adapted for guiding the tip of the spade bit into the existing opening in a position in which the tip of the spade bit is centered in the opening;
 wherein the mount includes a body configured for receiving the head of the spade bit and permitting the cutting blades of the spade bit to protrude outwardly from the body outboard of the guide;
 wherein the body includes a recess extending distally from the spade bit shaft receiving opening configured for receiving the spade bit from the spade bit shaft receiving opening, the recess including slots opening out opposite sides of the body for permitting the head of the spade bit to extend out of the body;
 wherein the mount includes a collet at the proximal portion of the mount for aligning the spade bit shaft with the guide.

10. A spade bit adaptor as set forth in claim 8 wherein the recess includes a spade bit tip receiving opening spaced distally from the spade bit shaft receiving opening, the spade bit tip receiving opening being sized and positioned for matingly receiving a portion of the spade bit tip less than the entire tip and engaging opposite sides of the tip along an intermediate portion of a length of the tip spaced distally from the cutting blades for centering the tip with respect to the guide.

11. A spade bit adaptor for centering a spade bit in an existing opening to be enlarged by the spade bit, the spade bit including a shaft and a head, the shaft having a proximal end and having a distal end connected to the head, the head having a tip and cutting blades extending laterally with respect to the tip, the spade bit having a longitudinal axis along which the shaft and tip extend, the spade bit adaptor comprising:
 a mount adapted for releasable mounting on the spade bit, the mount being configured to engage the shaft of the spade bit when the mount is mounted on the spade bit, the mount including a proximal portion and a distal portion positioned distally from the proximal portion, the mount including a spade bit shaft receiving opening in the proximal portion sized and positioned for permitting the shaft to extend out of said opening away from the distal portion when the mount is mounted on the spade bit for exposing the proximal end of the shaft outside the mount; and a guide on the distal portion of the mount, the guide being adapted for guiding the tip of the spade bit into the existing opening in a position in which the tip of the spade bit is centered in the opening;

wherein the mount includes a body configured for receiving the head of the spade bit and permitting the cutting blades of the spade bit to protrude outwardly from the body outboard of the guide;

wherein the body includes a recess extending distally from the spade bit shaft receiving opening configured for receiving the spade bit from the spade bit shaft receiving opening, the recess including slots opening out opposite sides of the body for permitting the head of the spade bit to extend out of the body;

wherein the recess includes a spade bit tip receiving opening spaced distally from the spade bit shaft receiving opening, the spade bit tip receiving opening being sized and positioned for matingly receiving a portion of the spade bit tip less than the entire tip and engaging opposite sides of the tip along an intermediate portion of a length of the tip spaced distally from the cutting blades for centering the tip with respect to the guide;

wherein a proximal section of the body is externally threaded, the mount further including an internally threaded member configured for threaded connection with the threaded proximal section, said member being movable distally via said threaded connection to engage a proximal side of the spade bit head for urging the spade bit tip distally in the spade bit tip receiving opening.

12. A spade bit adaptor for centering a spade bit in an existing opening to be enlarged by the spade bit, the spade bit including a shaft and a head, the shaft having a proximal end and having a distal end connected to the head, the head having a tip and cutting blades extending laterally with respect to the tip, the spade bit having a longitudinal axis along which the shaft and tip extend, the spade bit adaptor comprising:

a mount adapted for releasable mounting on the spade bit, the mount being configured to engage the shaft of the spade bit when the mount is mounted on the spade bit, the mount including a proximal portion and a distal portion positioned distally from the proximal portion, the mount including a spade bit shaft receiving opening in the proximal portion sized and positioned for permitting the shaft to extend out of said opening away from the distal portion when the mount is mounted on the spade bit for exposing the proximal end of the shaft outside the mount; and a guide on the distal portion of the mount, the guide being adapted for guiding the tip of the spade bit into the existing opening in a position in which the tip of the spade bit is centered in the opening;

wherein the mount includes a body configured for receiving the head of the spade bit and permitting the cutting blades of the spade bit to protrude outwardly from the body outboard of the guide;

wherein the body includes a recess extending distally from the spade bit shaft receiving opening configured for receiving the spade bit from the spade bit shaft receiving opening, the recess including slots opening out opposite sides of the body for permitting the head of the spade bit to extend out of the body;

wherein a proximal section of the body is externally threaded, the mount further including an internally threaded member configured for threaded connection with the threaded proximal section of the body for securing the spade bit in the recess.

13. A kit as set forth in claim 7 wherein the mount includes a body configured for receiving the spade bit for mounting the mount on the spade bit, the body including a recess extending distally from the spade bit shaft receiving opening configured for receiving the spade bit from the spade bit shaft receiving opening, the recess including slots opening out opposite sides of the body for permitting the head of the spade bit to extend out of the body.

14. A kit as set forth in claim 13 wherein the mount includes a collet at the proximal portion of the mount, the collet having spade bit engaging surfaces adapted for engaging the shaft of the spade bit, the spade bit engaging surfaces being selectively positionable with respect to each other for engaging the spade bit engaging surfaces with the shaft to orient the shaft with respect to the guide.

15. A kit as set forth in claim 13 wherein the recess includes a spade bit tip receiving opening spaced distally from the spade bit shaft receiving opening, the spade bit tip receiving opening being sized and positioned for matingly receiving a portion of the spade bit tip less than the entire tip and engaging opposite sides of the tip along an intermediate portion of a length of the tip spaced distally from the cutting blades for centering the tip.

16. A kit as set forth in claim 15 wherein a proximal section of the body is externally threaded, the mount further including an internally threaded member configured for threaded connection with the threaded proximal section, said member being movable distally via said threaded connection to engage a proximal side of the spade bit head for urging the spade bit tip distally in the spade bit tip receiving opening.

17. A kit as set forth in claim 13 wherein a proximal section of the body is externally threaded, the mount further including an internally threaded member configured for threaded connection with the threaded proximal section of the body for securing the spade bit in the recess.

* * * * *